(12) United States Patent
Nordby et al.

(10) Patent No.: US 12,474,792 B1
(45) Date of Patent: Nov. 18, 2025

(54) MARKER WRITING SYSTEM

(71) Applicant: reMarkable AS, Oslo (NO)

(72) Inventors: Gaute Wiig Nordby, Oslo (NO);
Espen Lie, Oslo (NO); Vegard Bakke Svendsen, Oslo (NO); Xian Dong Guo, Pudong (CN); Peng Shuai, Shenzhen (CN); Jin Qian, Shenzhen (CN); Wen Bin Zhou, Shenzhen (CN); Liang Xiong, Shenzhen (CN)

(73) Assignee: reMarkable AS, Oslo (NO)

( * ) Notice: Subject to any disclaimer, the term of this patent is extended or adjusted under 35 U.S.C. 154(b) by 0 days.

(21) Appl. No.: 18/779,164

(22) Filed: Jul. 22, 2024

(30) Foreign Application Priority Data

Jul. 8, 2024 (CN) .......................... 202410914145.6

(51) Int. Cl.
*G06F 3/0354* (2013.01)
*G06F 3/038* (2013.01)
*H01Q 1/22* (2006.01)

(52) U.S. Cl.
CPC ........ *G06F 3/03545* (2013.01); *G06F 3/0383* (2013.01); *H01Q 1/22* (2013.01)

(58) Field of Classification Search
CPC ...... G06F 3/03545; G06F 3/0383; H01Q 1/22
See application file for complete search history.

(56) References Cited

U.S. PATENT DOCUMENTS 6,064,765 A   5/2000   Hirayama
6,151,206 A  11/2000   Kato et al.
(Continued)

FOREIGN PATENT DOCUMENTS

CN   104142705 A   11/2014
CN   116257145 A   3/2023
(Continued)

OTHER PUBLICATIONS

A publication regarding the Aspire Switch 10 ("Acer") published on Aug. 1, 2014.
(Continued)

*Primary Examiner* — Christopher E Leiby
(74) *Attorney, Agent, or Firm* — AWA Sweden AB; Thomas L. Ewing

(57) ABSTRACT

Embodiments of the invention provide a pen-stylus that comprises a first antenna having a hemispherical shape at a proximal end of the pen-stylus where the pen-stylus engages with a display of a tablet device. The pen-stylus also includes a second antenna, wherein the first antenna and the second antenna communicate with the tablet device to enable a pen-stylus user to draw on the display of the tablet device. The pen-stylus additionally includes an insulating material between the first antenna and the second antenna that prevents interference between the first antenna and the second antenna. In some embodiments, the first antenna and the insulating material reside in a marker tip attached to the pen-stylus, the marker tip transmits axial forces received by engagement of the pen-stylus with the display on the tablet to a force sensor. The pen-stylus further includes a force sensor that converts axial forces received from the marker tip into an electrical signal and transmits the electrical signal to the tablet by at least one of the first antenna and the second antenna.

12 Claims, 10 Drawing Sheets

(56) References Cited

U.S. PATENT DOCUMENTS

| | | | |
|---|---|---|---|
| 7,145,092 B2 | 12/2006 | Tuhkala | |
| 7,239,505 B2 | 7/2007 | Keely et al. | |
| 7,461,444 B2 | 12/2008 | Deaett et al. | |
| 7,722,358 B2 | 5/2010 | Chatterjee et al. | |
| 7,941,191 B2 | 5/2011 | Hanssen et al. | |
| D645,465 S | 9/2011 | Lin | |
| 8,022,307 B2 | 9/2011 | Chu et al. | |
| 8,143,983 B1 | 3/2012 | Lauder et al. | |
| D671,114 S | 11/2012 | Akana | |
| 8,498,100 B1 | 7/2013 | Whitt et al. | |
| D689,482 S | 9/2013 | Akana | |
| D692,886 S | 11/2013 | Bates | |
| 8,638,320 B2 * | 1/2014 | Harley | G06F 3/0442 345/173 |
| D701,205 S | 3/2014 | Akana | |
| D702,229 S | 4/2014 | Lim | |
| 8,688,037 B2 | 4/2014 | Chatterjee et al. | |
| D704,702 S | 5/2014 | Akana | |
| D705,775 S | 5/2014 | Canizares | |
| 8,724,302 B2 | 5/2014 | Whitt et al. | |
| 8,780,541 B2 | 7/2014 | Whitt et al. | |
| D711,371 S | 8/2014 | Chen | |
| 8,817,457 B1 | 8/2014 | Colby et al. | |
| 8,873,227 B2 | 10/2014 | Whitt et al. | |
| 8,947,864 B2 | 2/2015 | Whitt et al. | |
| 8,947,868 B2 | 2/2015 | Motoishi et al. | |
| 8,964,379 B2 | 2/2015 | Rihn | |
| 9,017,092 B1 | 4/2015 | McCracken | |
| 9,146,620 B2 | 9/2015 | Whitt et al. | |
| 9,149,100 B2 | 10/2015 | Marshall | |
| 9,213,424 B1 | 12/2015 | Dunn | |
| 9,218,025 B2 | 12/2015 | Bates | |
| 9,239,639 B1 | 1/2016 | Vanderet | |
| 9,244,535 B2 | 1/2016 | Bates | |
| D750,621 S | 3/2016 | Loor Canizares | |
| 9,280,181 B2 | 3/2016 | Tomita et al. | |
| 9,335,793 B2 | 5/2016 | Rothkopf | |
| 9,390,869 B2 | 7/2016 | Lee | |
| 9,436,229 B2 | 9/2016 | Yoo | |
| 9,442,518 B2 | 9/2016 | Siddiqui | |
| 9,443,673 B2 | 9/2016 | Chu | |
| 9,451,822 B2 | 9/2016 | Gu | |
| 9,494,976 B2 | 11/2016 | Bates | |
| 9,494,977 B2 | 11/2016 | Spollen | |
| 9,496,102 B2 | 11/2016 | Bates | |
| D773,454 S | 12/2016 | Akana | |
| D776,116 S | 1/2017 | Akana | |
| 9,532,631 B2 | 1/2017 | Gu | |
| 9,552,014 B2 | 1/2017 | Tomita | |
| D779,485 S | 2/2017 | Akana | |
| 9,575,515 B2 | 2/2017 | Leon | |
| 9,588,551 B1 | 3/2017 | Hegde | |
| 9,607,491 B1 | 3/2017 | Mortimer | |
| 9,621,214 B2 | 4/2017 | Paek | |
| 9,632,602 B2 | 4/2017 | Marwah | |
| D786,238 S | 5/2017 | Roberts | |
| 9,678,542 B2 | 6/2017 | Whitt et al. | |
| D792,393 S | 7/2017 | Akana | |
| 9,705,242 B1 | 7/2017 | Heiskanen | |
| 9,705,243 B1 | 7/2017 | McCracken | |
| 9,715,251 B2 | 7/2017 | Chung | |
| D795,249 S | 8/2017 | Wall | |
| 9,720,453 B2 | 8/2017 | Nelson | |
| 9,728,915 B2 | 8/2017 | Aldehayyat | |
| 9,760,183 B2 | 9/2017 | Kawaguchi | |
| 9,762,279 B2 | 9/2017 | Lee | |
| 9,769,293 B2 | 9/2017 | Gu | |
| D801,330 S | 10/2017 | Morgan | |
| 9,778,705 B2 | 10/2017 | Esmaeili | |
| 9,785,193 B2 | 10/2017 | Sano | |
| 9,823,093 B2 | 11/2017 | Kauhaniemi | |
| D804,470 S | 12/2017 | Hallar | |
| 9,840,861 B1 | 12/2017 | Määttä | |
| 9,851,759 B2 | 12/2017 | Tazbaz | |
| D807,348 S | 1/2018 | Wang | |
| 9,883,583 B2 | 1/2018 | Cousins | |
| D810,075 S | 2/2018 | Liu | |
| D810,745 S | 2/2018 | Luo | |
| 9,893,452 B2 | 2/2018 | Wagman | |
| 9,904,327 B2 | 2/2018 | Whitt et al. | |
| 9,904,373 B2 | 2/2018 | Shirata | |
| 9,904,379 B2 * | 2/2018 | Marshall | G06F 3/0418 |
| 9,930,773 B2 | 3/2018 | Holbery | |
| 9,946,295 B2 | 4/2018 | Smith | |
| 9,946,296 B2 | 4/2018 | Smith | |
| 9,952,623 B2 | 4/2018 | Tomita | |
| 9,965,000 B2 | 5/2018 | Koppal | |
| 9,977,460 B2 | 5/2018 | Wagman | |
| D820,838 S | 6/2018 | Akana | |
| D820,839 S | 6/2018 | Akana | |
| D820,840 S | 6/2018 | Akana | |
| D820,841 S | 6/2018 | Akana | |
| 9,997,305 B2 | 6/2018 | Wang | |
| 9,997,308 B2 | 6/2018 | Leong | |
| 9,998,166 B2 | 6/2018 | Kim | |
| 10,013,030 B2 | 7/2018 | Whitt et al. | |
| 10,050,368 B2 | 8/2018 | Wagman | |
| 10,056,205 B2 | 8/2018 | Hegde | |
| 10,061,359 B2 | 8/2018 | Määttä | |
| 10,082,840 B2 | 9/2018 | Esmaeili | |
| 10,082,913 B2 | 9/2018 | Moller | |
| 10,090,121 B2 | 10/2018 | Winter | |
| D832,836 S | 11/2018 | Akana | |
| D835,097 S | 12/2018 | Morgan | |
| 10,153,577 B2 | 12/2018 | Wagman | |
| D839,266 S | 1/2019 | Chang | |
| 10,175,782 B2 | 1/2019 | Katsuhara | |
| D842,852 S | 3/2019 | Kim | |
| 10,257,950 B2 | 4/2019 | Määttä | |
| 10,289,210 B1 | 5/2019 | Wang | |
| 10,303,209 B2 | 5/2019 | Smith | |
| 10,303,215 B2 | 5/2019 | Corbin | |
| 10,317,953 B2 | 6/2019 | Esmaeili | |
| D852,794 S | 7/2019 | Huebner | |
| 10,345,916 B2 | 7/2019 | Gu | |
| 10,353,485 B1 | 7/2019 | Zhang | |
| 10,362,670 B2 | 7/2019 | Cousins | |
| D856,322 S | 8/2019 | Huebner | |
| 10,372,159 B2 | 8/2019 | Kim | |
| 10,418,741 B2 | 9/2019 | Wagman | |
| D867,452 S | 11/2019 | Morris | |
| 10,466,804 B2 | 11/2019 | Murphy | |
| 10,468,211 B2 | 11/2019 | Leong | |
| 10,474,199 B2 | 11/2019 | Longo | |
| 10,481,746 B2 | 11/2019 | Moller | |
| 10,483,688 B2 | 11/2019 | Wrisley | |
| 10,520,127 B2 | 12/2019 | Dearsley | |
| 10,551,878 B2 | 2/2020 | Longo | |
| 10,566,151 B1 | 2/2020 | Wang | |
| 10,579,097 B2 | 3/2020 | Wagman | |
| 10,590,600 B1 | 3/2020 | Wang | |
| 10,635,186 B1 | 4/2020 | Wang | |
| 10,672,548 B2 | 6/2020 | Srinivasan | |
| 10,683,591 B1 | 6/2020 | Podhajny | |
| 10,725,544 B1 | 7/2020 | Taylor | |
| 10,732,728 B1 | 8/2020 | Sunshine | |
| 10,739,825 B2 | 8/2020 | Gilbert | |
| 10,754,393 B2 | 8/2020 | Campbell | |
| D901,486 S | 11/2020 | Moon | |
| 10,890,954 B2 | 1/2021 | Evans | |
| 10,908,652 B2 | 2/2021 | Määttä | |
| 10,921,863 B2 | 2/2021 | Gault | |
| 10,923,261 B2 | 2/2021 | Singla | |
| 10,936,020 B2 | 3/2021 | Chang | |
| 10,948,999 B2 | 3/2021 | Hewett | |
| 10,955,943 B1 | 3/2021 | Large | |
| 11,023,016 B2 | 6/2021 | Kim | |
| 11,048,304 B2 | 6/2021 | Kang | |
| 11,048,337 B2 | 6/2021 | Fukumoto | |
| 11,061,442 B2 | 7/2021 | Gault | |
| 11,062,831 B2 | 7/2021 | Määttä | |
| 11,066,861 B2 | 7/2021 | Zhu | |
| 11,073,871 B2 | 7/2021 | Jung | |
| D928,145 S | 8/2021 | Solberg | |

(56) References Cited

U.S. PATENT DOCUMENTS

| | | | |
|---|---|---|---|
| D928,146 S | 8/2021 | Solberg | |
| 11,086,975 B2 | 8/2021 | Huang et al. | |
| 11,091,855 B2 | 8/2021 | Holbery | |
| 11,095,071 B2 | 8/2021 | Lee | |
| 11,119,535 B2 | 9/2021 | Haworth | |
| 11,211,212 B2 | 12/2021 | Huang | |
| 2003/0034960 A1 | 2/2003 | Li | |
| 2011/0147398 A1 | 6/2011 | Ahee | |
| 2011/0238055 A1* | 9/2011 | Kim | A61B 18/1815 606/33 |
| 2012/0327042 A1 | 12/2012 | Harley | |
| 2014/0006296 A1 | 1/2014 | Hughes et al. | |
| 2014/0043242 A1 | 2/2014 | Dietz | |
| 2014/0211393 A1 | 7/2014 | Lee | |
| 2015/0029161 A1* | 1/2015 | Koo | B43K 29/00 345/179 |
| 2015/0268742 A1 | 9/2015 | Park | |
| 2016/0044422 A1 | 2/2016 | Aurongzeb | |
| 2016/0188013 A1 | 6/2016 | Yoneoka | |
| 2016/0195942 A1 | 7/2016 | Chen | |
| 2016/0364027 A1 | 12/2016 | Bernstein | |
| 2017/0038842 A1 | 2/2017 | Yairi | |
| 2017/0068342 A1 | 3/2017 | Zimmerman | |
| 2017/0108953 A1 | 4/2017 | Mao | |
| 2017/0285774 A1 | 10/2017 | Parikh | |
| 2018/0052534 A1* | 2/2018 | Ron | G06T 11/60 |
| 2018/0329526 A1* | 11/2018 | Peretz | G06F 3/03545 |
| 2018/0348898 A1 | 12/2018 | Kato | |
| 2019/0369755 A1 | 12/2019 | Roper | |
| 2020/0033986 A1 | 1/2020 | Kämpf | |
| 2020/0401241 A1* | 12/2020 | Barel | G06F 3/04162 |
| 2021/0031235 A1 | 2/2021 | Neuwirth | |
| 2021/0103346 A1 | 4/2021 | Hoshino | |
| 2021/0247845 A1 | 8/2021 | Kügerl | |
| 2021/0247858 A1* | 8/2021 | Hashimoto | G06F 3/038 |
| 2021/0255716 A1* | 8/2021 | Jin | G06F 3/03545 |
| 2021/0311603 A1 | 10/2021 | Baki | |
| 2021/0382569 A1 | 12/2021 | Kamiyama | |
| 2022/0033600 A1 | 2/2022 | Hoshino | |
| 2022/0334661 A1* | 10/2022 | Barel | G06F 3/03546 |
| 2022/0397968 A1 | 12/2022 | Lien | |
| 2022/0413639 A1 | 12/2022 | Watanabe | |
| 2023/0045649 A1* | 2/2023 | Chen | H01Q 1/22 |
| 2023/0077162 A1 | 3/2023 | Sakamoto | |
| 2023/0108860 A1* | 4/2023 | Hashimoto | G06F 3/04162 345/174 |
| 2023/0234392 A1 | 7/2023 | Duffy | |
| 2023/0259221 A1 | 8/2023 | Fu | |
| 2024/0019945 A1* | 1/2024 | Horie | G06F 3/04883 |
| 2024/0094834 A1 | 3/2024 | Lee | |
| 2024/0160317 A1 | 5/2024 | Jang | |
| 2024/0329758 A1 | 10/2024 | Chou | |
| 2024/0411387 A1 | 12/2024 | Kato | |

FOREIGN PATENT DOCUMENTS

| | | |
|---|---|---|
| DE | 202013101011 U1 | 5/2013 |
| WO | 2001031457 A1 | 5/2001 |
| WO | 2021194484 A1 | 9/2021 |

OTHER PUBLICATIONS

PCT International Search Report and Written Opinion, PCT Application No. PCT/IB2022/000703, Jun. 2, 2023, 19 pages.

HW AF63 (MP 2018), schematic, released in 2018 and related product advertisement.

HP Zenvo (MP 2021) schematic, released in 2021 and related product advertisement.

Dell Hellcat (MP 2021) schematic, released in 2021 and related product advertisement.

Extended European Search Report, EP application 25173308.5, issued by the European Patent Office.

Extended European Search Report, EP application 25173333.3, issued by the European Patent Office.

Extended European Search Report, EP application 25173357.2, issued by the European Patent Office.

Extended European Search Report for EP 25173373.9, issued Sep. 12, 2025.

* cited by examiner

MARKER WRITING SYSTEM

CROSS-REFERENCE TO RELATED APPLICATIONS

The present application, U.S. patent application Ser. No. 18/779,164 entitled "Marker Writing System," is related to U.S. patent application Ser. No. 18/779,151, entitled "Replaceable Conductive Marker Tip", filed Jul. 22, 2024; U.S. patent application Ser. No. 18/779,154, entitled "Advanced Paper Emulation,", filed Jul. 22, 2024; U.S. patent application Ser. No. 18/779,158 entitled "Marker Protection System,", filed Jul. 22, 2024; U.S. patent application Ser. No. 18/779,170 entitled "Captive Object Flexure Mechanism,", filed Jul. 22, 2024; and U.S. patent application Ser. No. 18/779,149, entitled "Active Pen-Stylus Precise Eraser", filed Jul. 22, 2024, all of which are owned by the Applicant of the present application. These related applications are incorporated herein by reference in their entirety.

TECHNICAL FIELD

The disclosure relates generally to a pointing device, adapted for various coordinate input devices such as a digitizer or a tablet, which provide inputs to various types of computing systems. In particular, embodiments of the present invention relate to an improved writing system for a tablet device enabled by a specific arrangement of antennas in an active pen-stylus.

BACKGROUND

Mobile telephones, tablet computers, PCs, car entertainment systems, white goods and many other devices are commonly equipped with interactive displays. These interactive displays combine a display screen, such as an LCD, oLED, plasma or electrophoretic display (EPD), with an input system, such as a touch-or pen-stylus-input system. The input system recognizes the presence of an input object such as a pen-stylus touching or in proximity to the display screen. The device typically responds to such inputs by performing one or more functions, which may include changing what is shown on the display screen.

A "pen-stylus" (or "pen" or "stylus") is typically a pen-or pencil-shaped instrument whose position (e.g., tip position) on a computer monitor can be detected either electronically or physically. The pen-stylus enables users to perform tasks, such as drawing or making selections on a computing device. While devices with touchscreens, such as some computers, mobile devices (smartphones and personal digital assistants), game consoles, and graphics tablets, can often be operated with a fingertip, a pen-stylus typically provides more accurate and controllable input. In essence, a pen-stylus has a similar function as a mouse or touchpad as a pointing device but may enable much more precise inputs for certain drawing tasks. The use of a pen-stylus is sometimes termed "pen-stylus computing."

Conventional pen-styluses have typically been constructed to detect "pen-down" information in addition to coordinate information on the pointing device. Such pen-down information typically arises when the pen-stylus point is in contact with a panel of the digitizer. The pen-down information is conventionally detected by either force (e.g., pressure) sensitive means for detecting the vertical force applied to the pen-stylus point and/or detected by an electrical connection between the pen-stylus and the panel of the digitizer. The position data may be smoothed and/or de-noised before it is used to estimate the velocity and/or the acceleration of the input object. Such smoothing and/or de-noising may be done using an appropriate technique—for example, by applying a recursive Bayesian filter or smoothing, such as a Kalman filter, to the position data.

Active pen-styluses (also known as "active pen" or "digital styluses") include digital components and/or circuitry inside the pen-stylus that communicates with a digitizer on the touch device. This communication allows for advanced features such as force (e.g., pressure) sensitivity, tilt detection, programmable buttons, palm detection; eraser tips, memorizing settings, and writing data transmission.

Active pen-styluses typically employ different protocols from different manufacturers in order to communicate with the digitizer of a graphic tablet or multi-touch device. For an active pen-stylus to function properly, its digital component protocol must typically match the digitizer technology in the touch screen with which it interacts. Thus, the digital protocol of the pen-stylus must be compatible with the device digitizer, otherwise input from the pen-stylus will not register on the device. Active pen-styluses are typically powered by a removable or chargeable battery.

A pen-stylus' performance is often measured by four characteristics: 1) comfort, 2) resistance, 3) balance and overall weight, and 4) precision. "Precision" can sometimes be a nebulous characteristic, so it is often described in terms of further characteristics, such as: 1) responsiveness and speed, 2) jitter, 3) tilt, 4) levels of force (e.g., pressure), and 5) palm rejection or detection. This last element of precision may prevent a touch device from registering or marking the screen when a hand or palm is resting on the screen surface. Effective operation may rely on a combination of technology in the pen-stylus, the operating system software and the screen digitizer technology for effective operation.

While pen-stylus technology has made great strides in recent years in improving pen-stylus technology, further improvements are still warranted. Moreover, specific use cases for pen-styluses may compel levels of precision and additional functionality not available in conventional devices.

SUMMARY OF THE INVENTION

Embodiments of the invention provide a pen-stylus that comprises a first antenna having a hemispherical shape at a proximal end of the pen-stylus where the pen-stylus engages with a display of a tablet device. The pen-stylus also includes a second antenna, wherein the first antenna and the second antenna communicate with the tablet device to enable a pen-stylus user to draw on the display of the tablet device. The pen-stylus additionally includes an insulating material between the first antenna and the second antenna that prevents interference between the first antenna and the second antenna.

In some embodiments, the first antenna and the insulating material reside in a marker tip attached to the pen-stylus, the marker tip transmits axial forces received by engagement of the pen-stylus with the display on the tablet to a force sensor. The pen-stylus further includes a force sensor that converts axial forces received from the marker tip into an electrical signal and transmits the electrical signal to the tablet by at least one of the first antenna and the second antenna.

The pen-stylus in some embodiments may further have a pencil-shaped outer surface having a centerline running from the proximal end of the pen-stylus to a distal end of the pen-stylus, wherein the first antenna around the centerline avoids physical overlap with the second antenna around the centerline, wherein the insulating material resides around the centerline between the first antenna and the second antenna.

The pen-stylus may similarly have a pencil-shaped outer surface having a centerline running from the proximal end of the pen-stylus to a distal end of the pen-stylus, wherein the dimensions of the first antenna and the second antenna satisfy the following conditions: 1) a length of the second antenna along the centerline is approximately twice as long as a length of the first antenna; 2) a first edge of the second antenna closest to the proximal end of the pen-stylus has a diameter larger than a diameter of the first antenna along the centerline; and 3) a sum of the length of the second antenna along the centerline plus a length of the diameter of the second antenna at the proximal end is greater than a diameter of the second antenna at second edge of the second antenna located farthest from the proximal end.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

The figures depict various embodiments of the presented invention for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. An ordinarily skilled artisan will readily recognize from the following description that alternative embodiments of the structures and methods illustrated herein may be employed without departing from the principles described herein.

OVERVIEW

Disclosed is a system and related process) for a writing system enabled by an active pen-stylus for application with a tablet device, particularly an e-paper tablet device. The active pen-stylus has been designed to provide highly accurate signal input for the writing system of the e-paper tablet, enabled by careful attention to matters such as the design and placement of antennas in the active pen-stylus, including their geometries and their arrangement with respect to each other and with respect to the pen-stylus itself. A description of this specific invention begins around FIG. 15, following a description of a related pen-stylus that begins at FIG. 11. Before describing the invention in greater detail, a description will be provided of the e-paper tablet with which embodiments of the pen-stylus interact, as well as a description of an embodiment of the pen-stylus itself. Following this description, embodiments of the invention will be provided.

Example System and Device Configuration—for Supporting Tablet Device

Figure 1:
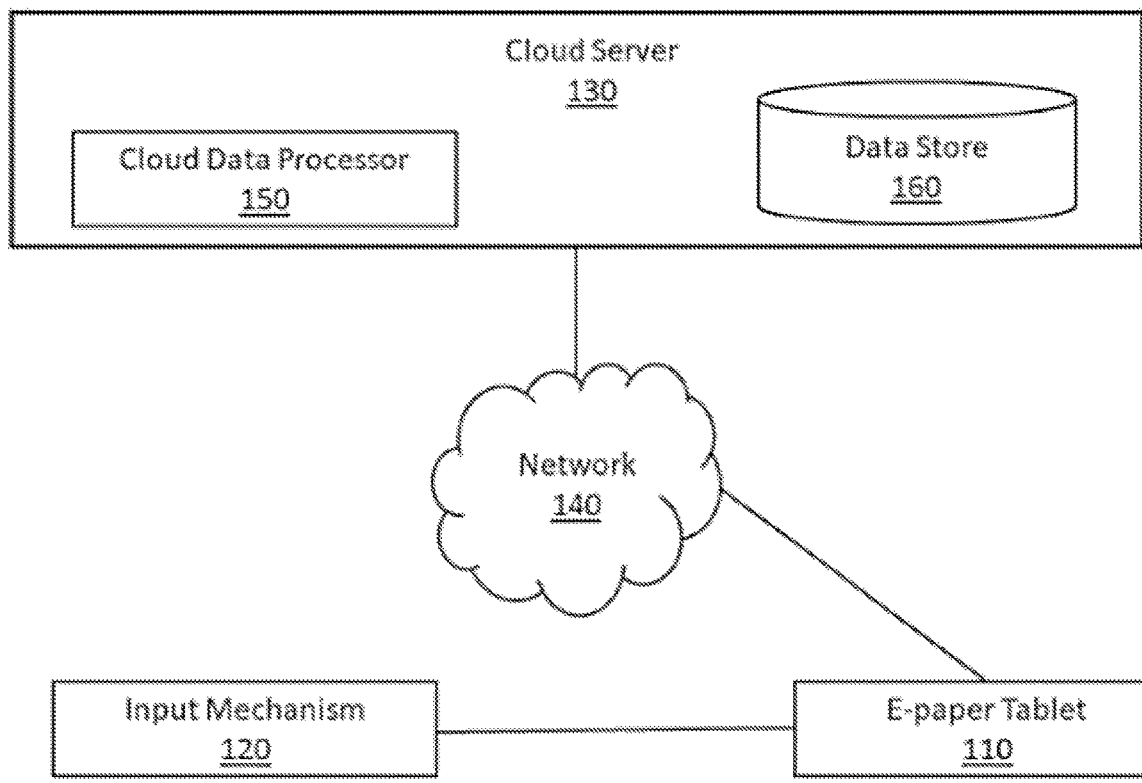
FIG. 1 illustrates a system architecture for an e-paper tablet device 110 that receives inputs from the input mechanism such as a pen-stylus, according to one example embodiment.

As shown in FIG. 1, an e-paper tablet device 110 receives inputs from the input mechanism 120, for example, when the input mechanism 120 makes physical contact with a contact-sensitive surface (e.g., the touch-sensitive screen) on the e-paper tablet device 110 as the user makes a gesture of some sort with the input mechanism 120. The input mechanism 120 may be a finger, pen-stylus or marker. The tablet device 110 here is referred to as an "e-paper tablet," a device that mimics the feeling of writing with ordinary pen and paper for users of the device. Such devices are also known as "electronic paper" and "electronic ink". Based on the nature of the contact, the e-paper tablet device 110 generates and executes instructions for updating content displayed on the contact-sensitive screen to reflect the gesture inputs. For example, in response to a gesture transcribing a verbal message (e.g., a written text or a drawing), the e-paper tablet device 110 updates the contact-sensitive screen to display the transcribed message. As another example, in response to a gesture selecting a navigation option, the e-paper tablet device 110 updates the screen to display a new page associated with the navigation option. While embodiments of the invention have been designed for e-paper systems, embodiments of the invention may also be suitable for other forms of computing devices capable of receiving and processing inputs from pen-stylus devices.

The input mechanism 120 may refer to any device or object that is compatible with the contact-sensitive screen of the e-paper tablet device 110, in particular a pen-stylus device, such as a so-called active pen device having its own power source or a static pen that receives its power from engagement with the contact-sensitive screen on the e-paper tablet device 110. In one embodiment, the input mechanism 120 may work with an electronic ink (e.g., E-ink) contact-sensitive screen. For example, the input mechanism 120 may refer to any device or object that can interface with a screen and, from which, the screen can detect a touch or contact of said input mechanism 120. Once the touch or contact is detected, electronics associated with the screen generate a signal which the e-paper tablet device 110 can process as a gesture that may be provided for display on the screen. Upon detecting a gesture by the input mechanism 120, electronics within the contact-sensitive screen generate a signal that encodes instructions for displaying content or updating content previously displayed on the screen of the e-paper tablet device 110 based on the movement of the detected gesture across the screen. For example, when processed by the e-paper tablet device 110, the encoded signal may cause a representation of the detected gesture to be displayed on the screen of the e-paper tablet device 110, such as a scribble. As mentioned, the input mechanism 120 may be a pen-stylus or another type of pointing device, including a part of a user's body, such as a finger.

In one embodiment, the input mechanism 120 is an encased magnetic coil. When in proximity to the screen of the e-paper tablet device 110, the magnetic coil helps generate a magnetic field that encodes a signal that communicates instructions, which are processed by the e-paper tablet device 110 to provide a representation of the gesture for display on the screen, e.g., as a marking. The input mechanism 120 may be force (e.g., pressure) and tilt-sensitive such that the system can make natural, visual response to both the pressure and tilt applied by the user. In turn, the interaction between the input mechanism and the contact-sensitive screen of the e-paper tablet device 110 may generate a different encoded signal for processing, for example, to provide for display a representation of the gesture on the screen that has different characteristics, e.g., thicker line marking. In alternate embodiments, the input mechanism 120 includes a power source (e.g., a battery) which can generate an electric field with a contact-sensitive surface. It is noted that the encoded signal is a signal that is generated and may be communicated. The encoded signal may have a signal pattern that may be used for further analog or digital analysis (or interpretation).

In one embodiment, the contact-sensitive screen is a capacitive touchscreen. The screen may be designed using a glass or polymer material coated with a conductive material. Electrodes, or an alternate current carrying electric component, are arranged along the coating of the screen (e.g., in a diamond-shaped cross hatch) to maintain a constant level of current running throughout the screen. A second set of electrodes are arranged horizontally. The matrix of vertical active electrodes and horizontal inactive electrodes generates an electrostatic field at each point on the screen. When an input mechanism 120 with conductive properties, for example the encased magnetic coil, a human finger, or something else that triggers the capacitive effect, is brought into contact with an area of the screen of the e-paper tablet device 110, current flows through the horizontally arranged electrodes, disrupting the electrostatic field at the contacted point on the screen. The disruption in the electrostatic field at each point that a gesture covers may be measured, for example as a change in capacitance, and encoded into an analog or digital signal.

In an alternate embodiment, the contact-sensitive screen is a resistive touchscreen. The resistive touch screen comprises two metallic layers: a first metallic layer in which striped electrodes are positioned on a substrate, such as a glass or plastic and a second metallic layer in which transparent electrodes are positioned. When contact from an input mechanism, for example a pen-stylus, finger, or palm, is made on the surface of the touchscreen, the two layers are pressed together. Upon contact, a voltage gradient is applied to the first layer and measured as a distance by the second layer to determine a horizontal coordinate of the contact on the screen. The voltage gradient is subsequently applied to the second layer to determine a vertical coordinate of the contact on the screen. The combination of the horizontal coordinate and the vertical coordinate register an exact location of the contact on the contact-sensitive screen. Unlike capacitive touchscreens which rely on conductive input mechanisms, a resistive touchscreen is configured to sense contact from nearly any input mechanism. Although some embodiments of the e-paper tablet device 110 are described herein with reference to a capacitive touchscreen, one skilled in the art would recognize that a resistive touchscreen could also be implemented.

In an alternate embodiment, the contact-sensitive screen is an inductive touchscreen. An inductive touchscreen comprises a metal front layer that is configured to detect deflections when contact is made on the screen by an input mechanism. Accordingly, an inductive touchscreen is configured to sense contact from nearly any input mechanism. Although some embodiments of the e-paper tablet device 110 are described herein with reference to a capacitive touchscreen, an ordinarily skilled artisan would recognize that alternative touchscreen technology may be implemented, for example, an inductive touchscreen could also be implemented.

The cloud server 130 is configured to receive information from the e-paper tablet device 110 and/or communicate instructions to the e-paper tablet device 110, according to some embodiments of the invention. As illustrated in FIG. 1, the cloud server 130 may comprise a cloud data processor 150 and a data store 160. Data recorded and stored by the e-paper tablet device 110 may be communicated via the network 140 to the cloud server 130 for storage in the data store 160. For example, the data store 160 may store documents, images, or other types of content generated or recorded by a user through the e-paper tablet device 110. In some embodiments, the cloud data processor 150 monitors the activity and usage of the e-paper tablet device 110 and communicates processing instructions to the e-paper tablet device 110. For example, the cloud data processor 150 may regulate synchronization protocols for data stored in the data store 160 with the e-paper tablet device 110.

Interactions between the e-paper tablet device 110 and the cloud server 130 are typically performed via the network 140, which enables communication between the e-paper tablet device 110 and the cloud server 130. In one embodiment, the network 140 uses standard communication technologies and/or protocols including, but not limited to, links using technologies such as Ethernet, 802.11, worldwide interoperability for microwave access (WiMAX), 3G, 4G, LTE, digital subscriber line (DSL), asynchronous transfer mode (ATM), InfiniBand, and PCI Express Advanced Switching. The network 140 may also utilize dedicated, custom, or private communication links. The network 140 may comprise any combination of local area and/or wide area networks, using both wired and wireless communication systems. The cloud server 130 may be alternatively implemented, and in some embodiments may be replaced by hardware and software that provide similar functionality while possibly not being considered a conventional cloud server.

Figure 2:
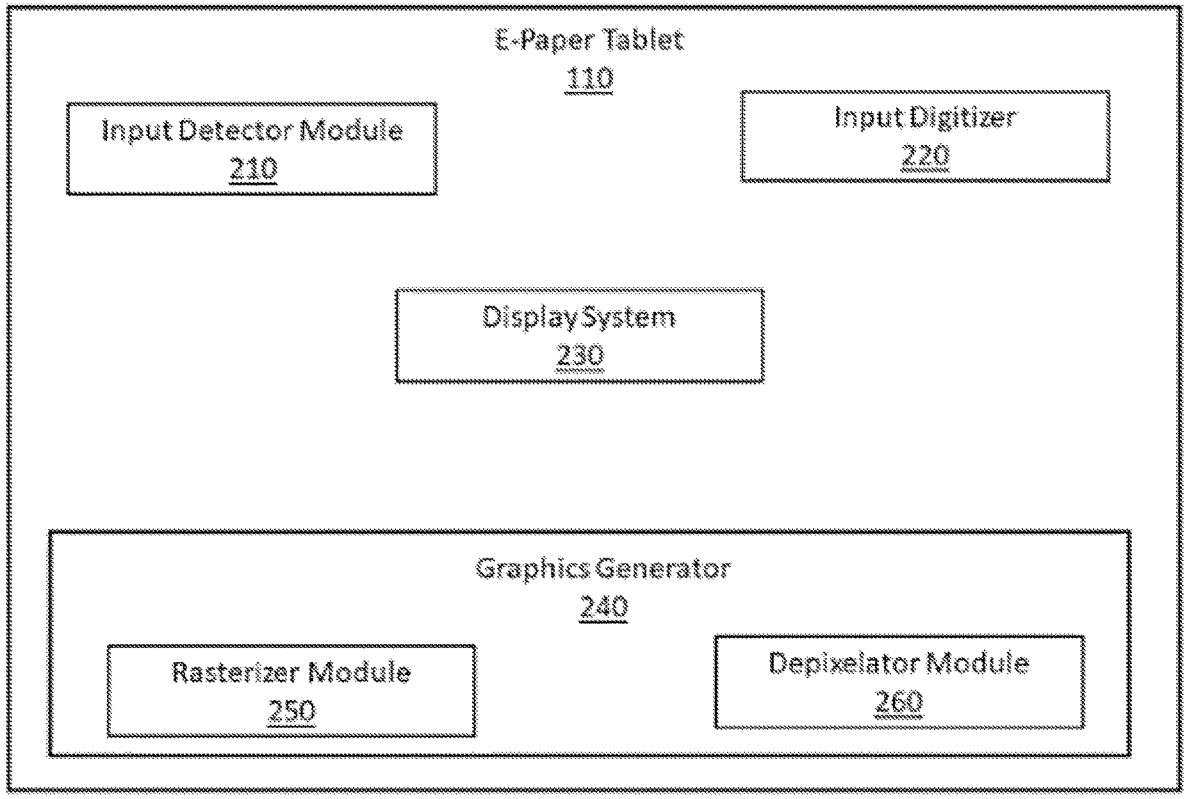
FIG. 2 is a block diagram of the system architecture of an e-paper tablet device 110, according to one example embodiment.

FIG. 2 is a block diagram of the system architecture of an e-paper tablet device 110, according to one example embodiment. In the embodiment illustrated in FIG. 2, the e-paper tablet device 110 comprises an input detector module 210, an input digitizer 220, a display system 230, and a graphics generator 240.

The input detector module 210 recognizes that a gesture has been or is being made on the screen of the e-paper tablet device 110. The input detector module 210 refers to electronics integrated into the screen of the e-paper tablet device 110 that are configured to interpret an encoded signal generated by contact between the input mechanism 120 and the screen into a recognizable gesture. To do so, the input detector module 210 may evaluate properties of the encoded signal to determine whether the signal represents a gesture made intentionally by a user or a gesture made unintentionally by a user.

The input digitizer 220 may be configured to convert the analog signal encoded by the contact between the input mechanism 120 and the screen into a digital set of instructions. The converted digital set of instructions may be processed by the e-paper tablet device 110 to generate or update a user interface displayed on the screen to reflect an intentional gesture.

The display system 230 may include the physical and firmware (or software) components to provide for display (e.g., render) on a screen a user interface. The user interface may correspond to any type of visual representation that may be presented to or viewed by a user of the e-paper tablet device 110.

Based on the digital signal generated by the input digitizer 220, the graphics generator 240 may be configured to generate or update graphics of a user interface to be displayed on the screen of the e-paper tablet device 110. The display system 230 may be configured to present those graphics of the user interface for display to a user using electronics integrated into the screen.

When an input mechanism 120 makes contact with a contact-sensitive screen of an e-paper tablet device 110, the input detector module 210 recognizes a gesture has been made through the screen. The gesture may be recognized as a part of an encoded signal generated by a pressure or force sensor in the input mechanism 120 and/or corresponding electronics of the screen of the display system 230. The encoded signal is transmitted to the input detector module 210, which evaluates properties of the encoded signal in view of at least one gesture rule to determine whether the gesture was made intentionally by a user. If the input detector module 210 determines that the gesture was made intentionally, the input detector module 210 communicates the encoded signal to the digitizer output. The encoded signal is an analog representation of the gesture received by a matrix of sensors embedded in the screen of the device 110.

In one example embodiment, the input digitizer 220 translates the physical points on the screen that the input mechanism 120 made contact with into a set of instructions for updating what is provided for display on the screen. For example, if the input detector module 210 detects an intentional gesture that swipes from a first page to a second page, the input digitizer 220 receives the analog signal generated by the input mechanism 120 as it performs the swiping gesture. The input digitizer 220 generates a digital signal for the swiping gesture that provides instructions for the display system 230 of the e-paper tablet device 110 to update the user interface of the screen to transition from, for example, a current (or first page) to a next (or second page, which may be before or after the first page).

In one example embodiment, the graphics generator 240 receives the digital instructional signal, such as a swipe gesture indicating page transition (e.g., flipping or turning) generated by the input digitizer 220. The graphics generator 240 generates graphics or an update to the previously displayed user interface graphics based on the received signal. The generated or updated graphics of the user interface are provided for display on the screen of the e-paper tablet device 110 by the display system 230, e.g., displaying a transition from a current page to a next page to a user. In the displayed embodiment of the FIG. 2, the graphics generator 240 comprises a rasterizer module 250 and a depixelator module 260. Input gestures drawn by a user on a contact-sensitive surface are received as vector graphics and are input to the rasterizer module 250. The rasterizer module 250 converts the input vector graphics to raster graphics, which can be displayed (or provided for display) on the contact-sensitive surface. The depixelator module 260 may apply image processing techniques to convert the displayed raster graphics back into vector graphics, for example to improve processing power of the e-paper tablet device 110 and to conserve memory of the e-paper tablet device 110. In at least one implementation, the depixelator module 260 may convert a displayed raster graphic back to a vector graphic when exporting content displayed on the screen into a different format or to a different system.

Further details about structures and functions of e-paper tablets and their graphical displays can be found in U.S. Pat. No. 11,158,097 to Martin Sandsmark and Gunnar Sletta entitled "Generating vector graphics by processing raster graphics" and in U.S. Pat. No. 10,824,274 to Sondre Hoff Dyvik, Martin Sandsmark, and Magnus Haug Wanberg, entitled "Interactive displays," both of which are incorporated by reference herein.

Figure 3:
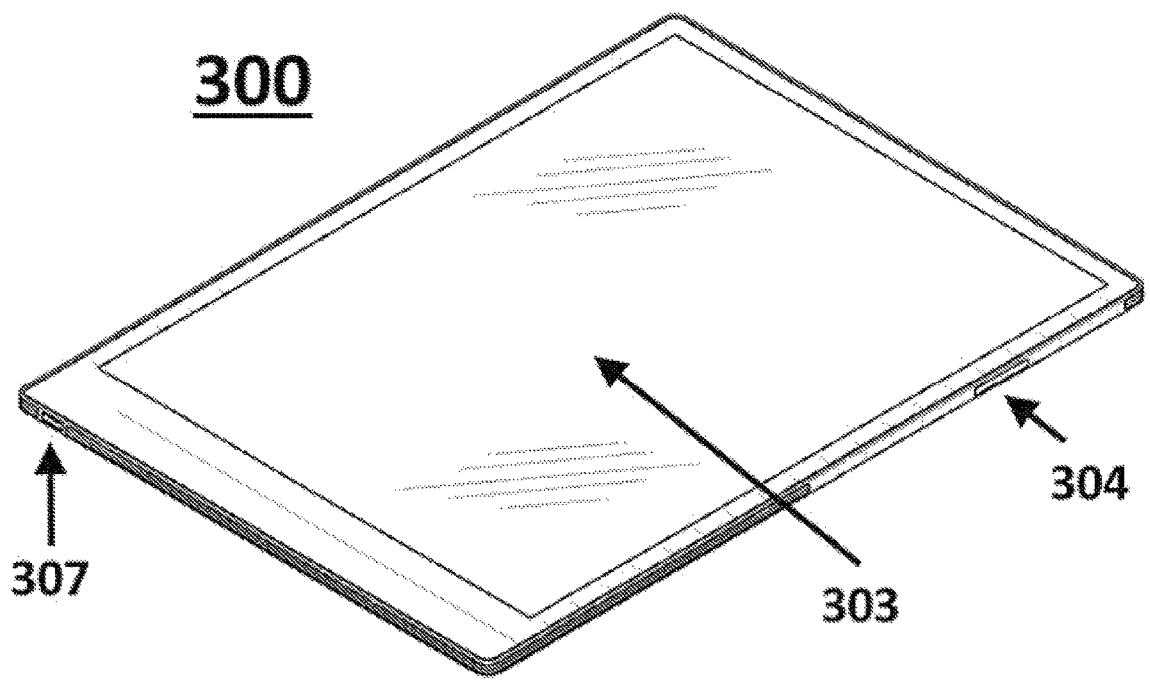
FIG. 3 illustrates a front and right perspective view of an e-paper tablet 300 having the functionality described for the e-paper tablet device 110 in FIGS. 1-2.

FIG. 3 illustrates a front and right perspective view of an e-paper tablet 300 having the functionality described for the e-paper tablet device 110 in FIGS. 1-2. Among other things, the e-paper table 300 includes a touch-sensitive display 303. The display 303 has been treated to provide a paper-feeling for users of the device when they engage with it using an input device 120. FIG. 3 also shows a charging area 304 for recharging the input device 120, when the input device is an active pen-stylus, according to an embodiment of the invention. Inside the e-paper tablet 300 near where the charging area 304 is located may be a set of magnets to hold the input device 120 in place while it is re-charging. FIG. 3 also shows a USB-c connector 307 that may be used to provide electrical power to the e-paper tablet 300, as well as transmitting various types of data into or out of the e-paper tablet 300. The e-paper tablet 300 also includes several actuators and other features that will be shown below in FIGS. 5-10.

Figure 4:
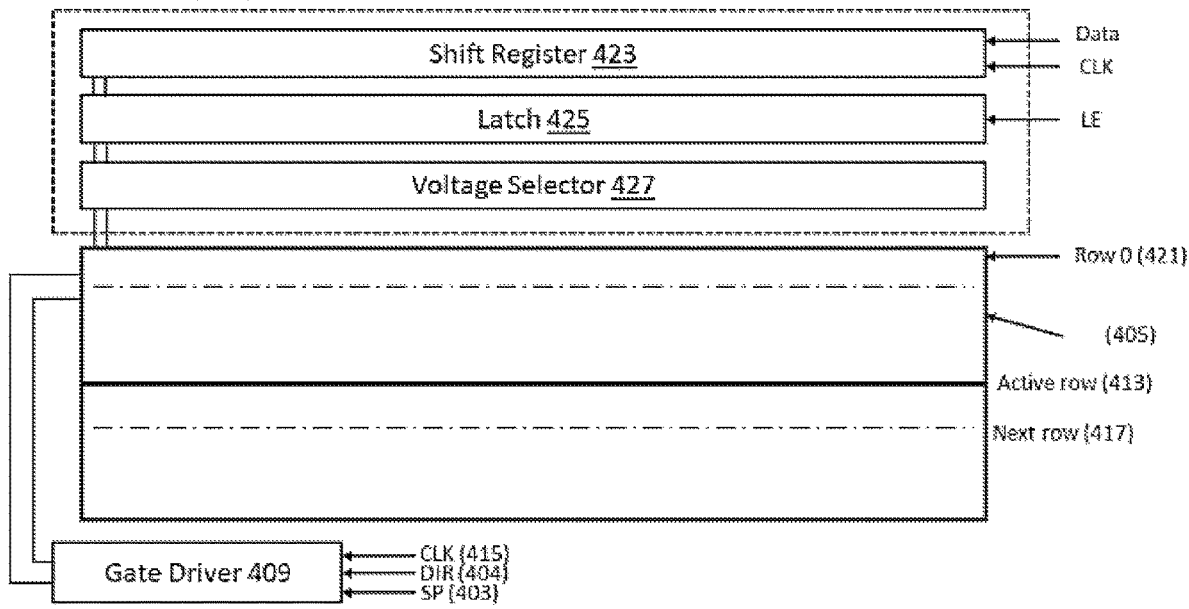
FIG. 4 illustrates hardware components of an example Electrophoretic Display (EPD) operating in an e-paper tablet device 110, according to one example embodiment.

FIG. 4 illustrates hardware components of an example Electrophoretic Display (EPD) in accordance with a disclosed embodiment. As discussed, a variety of display technologies may be employed, including EPDs, LCDs, and reflective LCDs (rLCDs). The specific display device deployed may be part of the display system 230 of the e-paper tablet device 110 shown in FIG. 2 and produce the images shown on the display 303 of the e-paper tablet 300 shown in FIG. 3. The EPD includes a gate driver 409, a source driver 411, a shift register 423 with data and clock signal line, a latch 425, a voltage selector 427, and rows making up a display 405. The EPD industry borrowed certain components and concepts from the LCD industry; however, these two devices have some fundamental differences as well. Of particular relevance here is the persistence of pixels in EPD displays. Unlike LCD displays, EPD displays do not require the frequent refreshing required in an LCD display. In an EPD display, once a neutral voltage is set for a pixel, the pixel will not change, for example, and will persist for a long period of time, especially relative to an LCD display.

As mentioned, Electrophoretic displays (EPDs) 405 have utilized many aspects of LCD production infrastructure and driving mechanisms. The driving electronics typically consist of a gate driver (GD) 409 and a source driver (SD) 411. The display 405 has multiple rows of pixels. Pixel values within a row may be changed, e.g., logic high voltage may be a "black" pixel and a logic low voltage or "ground" may be a no color pixel. The pixels in the EPD 405 function similarly to small capacitors that persist over long time intervals. An EPD pixel contains a large number of charged particles that are suspended in a liquid. If a charge is applied, the particles will move to a surface where they become visible. White and black particles have opposite charges such that a pixel's display may change from white to black by applying an opposite charge to the pixel. Thus, the waveforms applied to an EPD comprise long trains of voltages to change from black to white or vice versa. The EPD arts are also known to have the ability to apply variable voltage levels that mix the white and black particles to produce various shades of gray. Voltage levels in a pixel also may be tiered between to provide shades between no color and black (e.g., levels of grey). Groups of pixels around each other may form a region that provides some visible characteristic to a user, e.g., an image on a screen, e.g., of the display system 230 of the e-paper tablet device 110.

To change pixel values in a region, a scan of a display 405 will conventionally start at a top row, e.g., row 0 421, and apply voltages to update pixels within a particular row where pixels need to be changed to correspond with the image that is displayed. In this example, a start pulse (GDSP) 403 can be used to reset the driver 411 to row 0 421, and a direction (DIR) 404 can be used to reset a direction. A row-by-row selection is made by driving the driver gate 409 to select a row, e.g., active row 413. All pixels in one row are addressed concurrently using data transferred to the display. Latch 425 receives from the shift register 423 the next set of voltages to be applied to a row of pixels. When the scan of the active row is completed and, if necessary, pixels changed or updated, a clock pulse (GDCLK) 415 is issued to the driver gate 409 to change to the next row 417 for a scan.

As mentioned above, an ordinary artisan will recognize that a similar function can be accomplished also with a standard LCD, OLED, MicroLED or other type of display, and the description of EPD technology is provided here merely for illustration of one embodiment of the invention.

The source driver 411 is used to set the target voltage for each of the pixels/columns for the selected row. It consists of a shift register 423 for holding the voltage data, a latch circuit 425 for enabling pixel data transfer while the previous row is being exposed, and a voltage selector (multiplexer) 427 for converting the latched voltage selection into an actual voltage. For all rows to be updated all the voltage values have to be shifted into the register 423 and latched for the voltages to be available.

Figure 5:
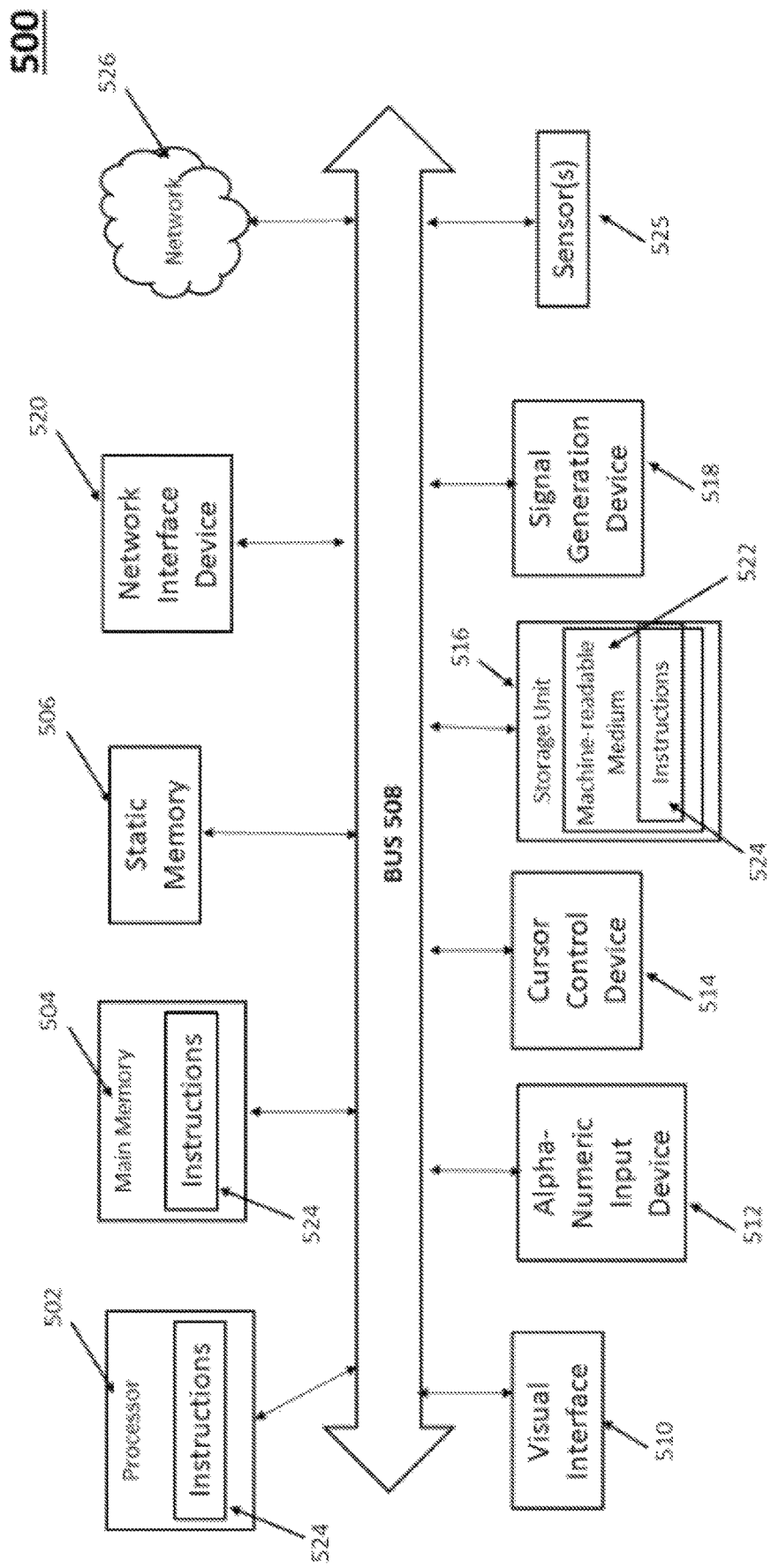
FIG. 5 is a block diagram illustrating components of an example machine able to read instructions from a machine-readable medium and execute them in a processor (or controller), according to one example embodiment.

FIG. 5 is a block diagram illustrating components of an example machine able to read instructions from a machine-readable medium and execute them in a processor (or controller), according to one embodiment. In this example, FIG. 5 shows a diagrammatic representation of a machine in the example form of a computer system 500 (e.g., the computing portions of the e-paper tablet 111 shown in FIG. 1) within which program code (e.g., software) for causing the machine to perform any one or more of the methodologies discussed herein may be executed. The e-paper tablet device 110 may include some or all of the components of the computer system 500. The program code may be comprised of instructions 524 executable by one or more processors 502. In the e-paper tablet system 110, the instructions may correspond to the functional components described in FIGS. 1, 2, and 4. FIG. 5 is an example of a processing system, of which a some of the described components or all of the described components may be leveraged by the modules described herein for execution.

While the embodiments described herein are in the context of the e-paper tablet system 110, it is noted that the principles may apply to other touch sensitive devices. In those contexts, the machine of FIG. 5 may be a server computer, a client computer, a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processors 502 (e.g., a central processing unit (CPU), one or more graphics processing units (GPU), one or more digital signal processors (DSP), one or more application specific integrated circuits (ASICs), one or more radio-frequency integrated circuits (RFICs), or any combination of these), a main memory 504, and a static memory 506, which are configured to communicate with each other via a bus 508. The computer system 500 may further include visual display interface 510. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen or display screen. The visual interface 510 may include or may interface with a touch enabled screen, e.g., of the e-paper tablet system 110 and may be associated with the display system 230. The computer system 500 may also include an input device 512 (e.g., a pen-stylus, a keyboard, or touch screen keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a machine-readable medium 522 on which is stored (or encoded) instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network 426 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

The computer system 500 also may include the one or more sensors 525. Also note that a computing device may include only a subset of the components illustrated and described with FIG. 5. For example, an IoT device may only include a processor 502, a small storage unit 516, a main memory 504, a visual interface 510, a network interface device 520, and a sensor 525.

Representative E-Paper Tablet

Figure 6:
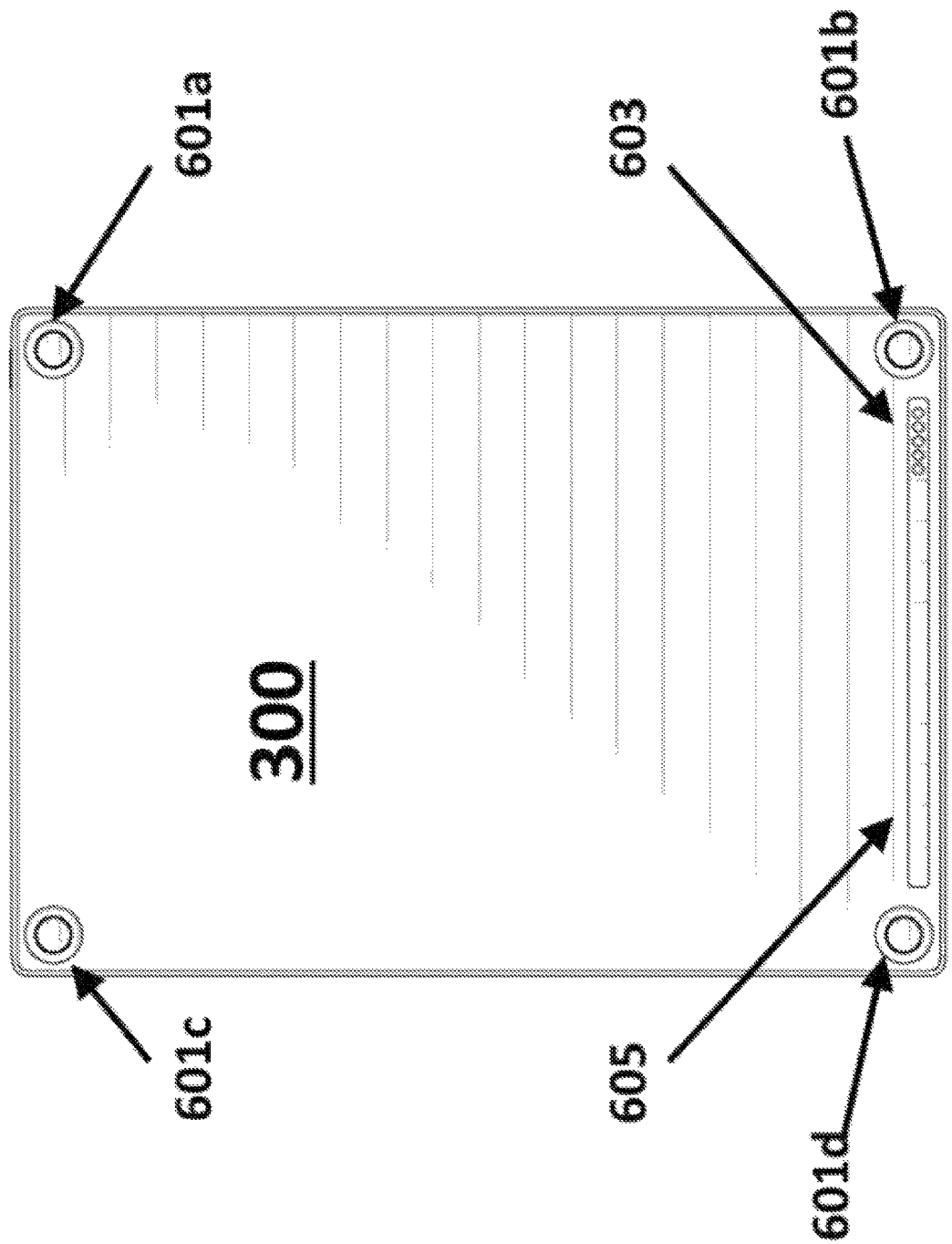
FIG. 6 illustrates a rear view of the e-paper tablet 300 showing volcano fee 601a-601d, a pogo pad 603, and an antenna region 605, according to an embodiment of the invention.

FIG. 3 provided a representative view of an e-paper tablet 300, resembling the e-paper 110 shown in FIGS., 1-2. FIG. 6 illustrates a rear view of the e-paper tablet 300 showing volcano fee 601a-601d, a pogo pad 603, and an antenna region 605, according to an embodiment of the invention. The antenna region 605 resides outside and above the location for a main antenna (e.g., an antenna on the e-paper tablet 110 that communicates with the cloud server 130 shown in FIG. 1 and which may generate the e-paper tablet's beacon signal discussed below with respect to FIG. 14) for the e-paper tablet 300, allowing the e-paper tablet device 300 to connect to the Internet, for example. The pogo pad 603 allows the e-paper tablet device 300 to connect to other devices, such as a folio device having a keyboard, for example.

Figure 7:
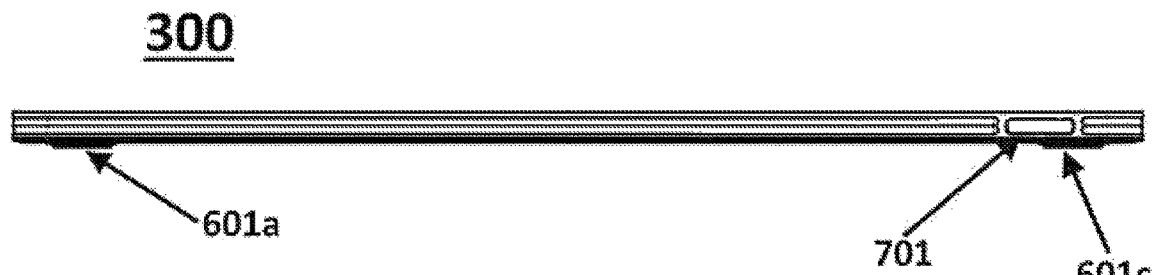
FIG. 7 illustrates a top view of the e-paper tablet device 300 showing volcano feet 601a, 601d, and a power button 701, according to an embodiment of the invention.

FIG. 7 illustrates a top view of the e-paper tablet device 300 showing volcano feet 601a, 601d, and a power button 701, according to an embodiment of the invention.

Figure 8:
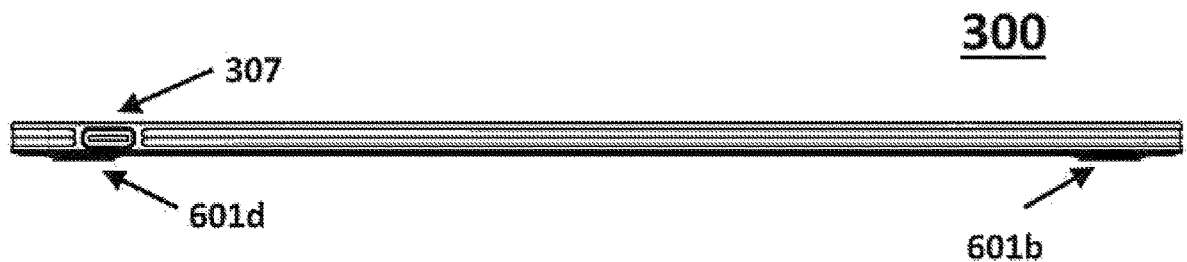
FIG. 8 illustrates a bottom view of the e-paper tablet device 300 showing volcano feet 601b, 601d and the USB-c connector 307, according to an embodiment of the invention.

FIG. 8 illustrates a bottom view of the e-paper tablet device 300 showing volcano feet 601b, 601d and the USB-c connector 307, according to an embodiment of the invention.

Figure 9:
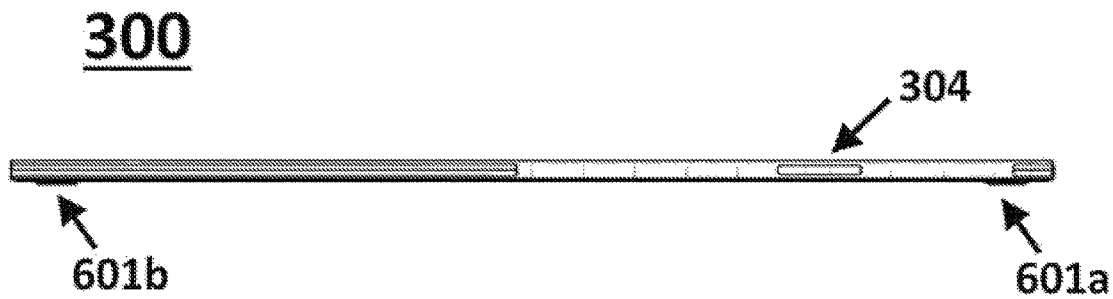
FIG. 9 illustrates a right view of the e-paper tablet device 300 showing volcano feet 601b, 601a, and the charging area 304 for recharging the input device 120, when the input device is an active pen-stylus, according to an embodiment of the invention.

FIG. 9 illustrates a right view of the e-paper tablet device 300 showing volcano feet 601b, 601a, and the charging area 304 for recharging the input device 120, when the input device is an active pen-stylus, according to an embodiment of the invention. Inside the e-paper tablet 300 near where the charging area 304 is located may be a set of magnets to hold the input device 120 in place while it is re-charging.

Figure 10:
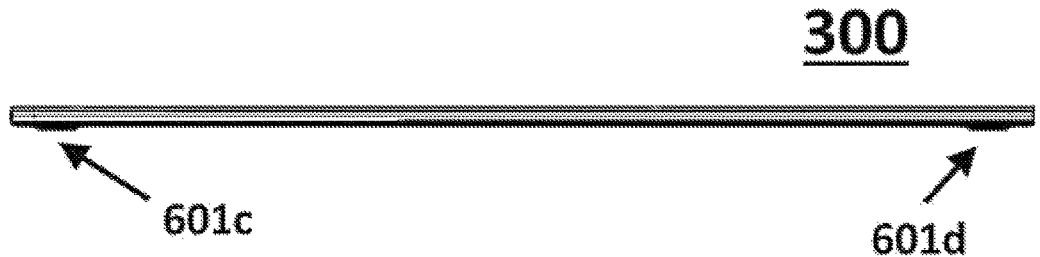
FIG. 10 illustrates a left view of the e-paper tablet device 300 showing volcano feet 601c, 601d, according to an embodiment of the invention.

FIG. 10 illustrates a left view of the e-paper tablet device 300 showing volcano feet 601c, 601d, according to an embodiment of the invention.

Example Active Pen in Operation

An active pen-stylus (or more commonly "active pen") is a pen-stylus input device that allows users to e.g., write, sketch or draw on the display of the computing device, e.g., the e-paper tablet 110. An active pen-stylus includes digital components and/or circuitry that communicate with the computing device, e.g., the e-paper tablet. This communication enables advanced features such as force (e.g., pressure) sensitivity, tilt detection, programmable buttons, palm detection, eraser tips, memorizing settings, and writing data transmission. Viewed more expansively, communications between the computing device and the active pen-stylus enables a wide mix of peripheral sensors to be placed in the active pen-stylus with the resulting data reported to the computing device, e.g., the e-paper tablet. Such sensors placed in the active pen-stylus may range from simple buttons to enhanced artificial intelligence features.

An active pen's electronic components typically include a power source that may enable the device's electronics to provide lower latency and greater fidelity than other pen types, e.g., a passive pen. Active pens provide a number of advantages over passive pens, including hover latency, e.g., an active pen may typically be activated by merely being in proximity to a display, e.g., the display associated with the e-paper tablet 110.

Once the active pen touches or contacts a display screen of a device like an e-paper tablet, electronics associated with the display screen generates a signal which the e-paper tablet (e.g., the e-paper tablet 110) can process as a gesture made by the user. Upon detecting the gesture by the pen-stylus, electronics within the contact-sensitive screen generates a signal that encodes instructions for displaying content or updating content previously displayed on the screen of the e-paper tablet device based on the movement of the detected gesture across the screen.

In contrast with an active pen, a passive pen typically has no internal power source. A passive pen remains in an inactive state until the pen touches a device screen (e.g., a tablet device screen) causing a signal to pass from the device through the passive stylus and back to the device. The electronics associated with a passive pen may be integrated into the pen-stylus device or even provided in a small cartridge that is placed inside a pen-shaped stylus cover designed to better suit human ergonomics than the small cartridge containing the electronics and other components.

Figure 11:
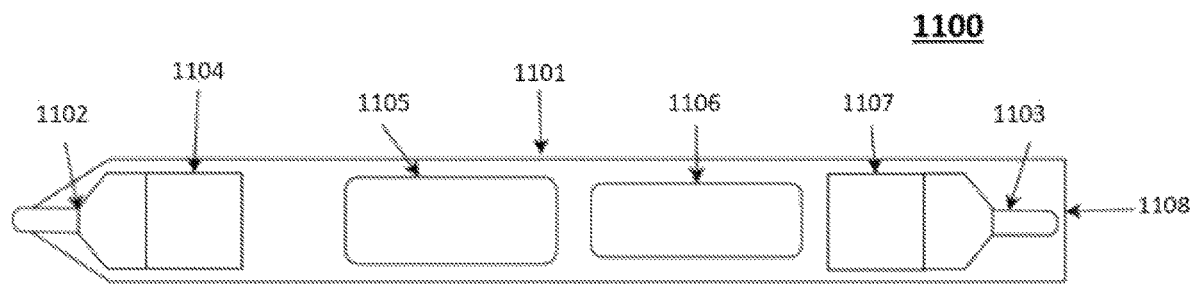
FIG. 11 illustrates a pen-stylus 1100 suited for application in at least one embodiment of the invention.

FIG. 11 illustrates an active pen-stylus 1100 that comprises a core member 1102 that itself comprises one or more antennas configured for communications with a tablet device, such as the e-paper tablet 110. The active pen-stylus 1100 may include one or more force sensing systems 1104 that detect force, e.g., the forces exerted on a display of an e-paper tablet 110 by a user. In addition, the active pen-stylus 1100. In addition, this element may also help emulate human interaction with conventional writing utensils like pencil and paper, e.g., render "a pencil and paper stack feeling". The active pen-stylus 1100 also includes a power source, e.g., a battery 1106. Among other things, the battery 1106 allows the active pen-stylus 1100 to support a "hover" function that allows the active pen-stylus 1100 to enter a sleep state for battery charge preservation when it is not actively engaged with the display of the e-paper tablet 110 and to wake up from the sleep state when the core member 1102 detects a proximity to the display of the e-paper tablet 110. The active pen-stylus 1100 might not actually draw lines on the display of the e-paper tablet 110 until a tip of the active pen-stylus 1100 physically touches the display of the e-paper tablet 110, according to an embodiment of the invention.

An active pen 1100 conventionally comprises a PCBA 1105 which includes electronic components needed for driving the signal lines associated with the core member 1102. The PCBA 1105 could alternatively be provided as a flexible printed circuit (FPC). The PCBA 1105 may include an appropriate active pen PCBA or IC/ASIC/MCU that processes data received from the core member 1104 for sensing force or displacement pressure with high resolution sensing of the force during the interaction between the active pen 1100 and an object, e.g., the surface of the computing device, such as the e-paper tablet 110).

The active pen 1100 may serve as the input mechanism 120 described in FIG. 1 that provides data input to the e-paper tablet 110, which may result in a drawing appearing on the display of the e-paper tablet 110. The active pen 1100 may also include an erasure system that receives user instructions related to erasing portions of a display on the screen of the associated computing device, e.g., the e-paper tablet 110. In a sense, the erasure system operates identically as the active pen-stylus system but where one draws, the other erases.

In operation, the force sensing system 1104 receives physical forces imparted to a marker tip of the active pen 1100 (e.g., the marker tip 1202 shown in FIG. 12) when the marker tip engages with a display on a tablet device (e.g., the e-paper tablet 110) and translates the physical force received into an electronic signal that is transmitted to the PCBA 1105 whose electronic components may perform a variety of processes on the signals received. The PCBA 1105 may then transmit the signals back to the tablet device (e.g., the e-paper tablet 110) for further action (e.g., drawing a line).

In embodiments where a secondary antenna system in the active pen 1100 enables tail eraser functionality, the active pen 1100 also comprises a second antenna system 1103, which enables the active pen 1100 to transmit and receive signals with the computing device (e.g., the e-paper tablet 110) through the tail eraser portion of the active pen 1100 near a cap 1108. In this embodiment, the active pen 1100 also includes a second force (e.g., pressure) sensing system 1107 that controls the force (e.g., pressure) imparted to the display of the computing device from the erasure activity.

Likewise, the PCBA 1105 may include an appropriate active pen PCBA or IC/ASIC/MCU that process data associated with erasure functionality received from the second antenna system 1103.

The active pen 1100 also typically includes an external casing 1101 as a pen-stylus holder, typically formed in a cylindrical shape and made of non-metal material such as a plastic that contains the internal electronics within the casing 1101. The top end of the casing 1101 may be provided with the cap 1108.

Figure 12:
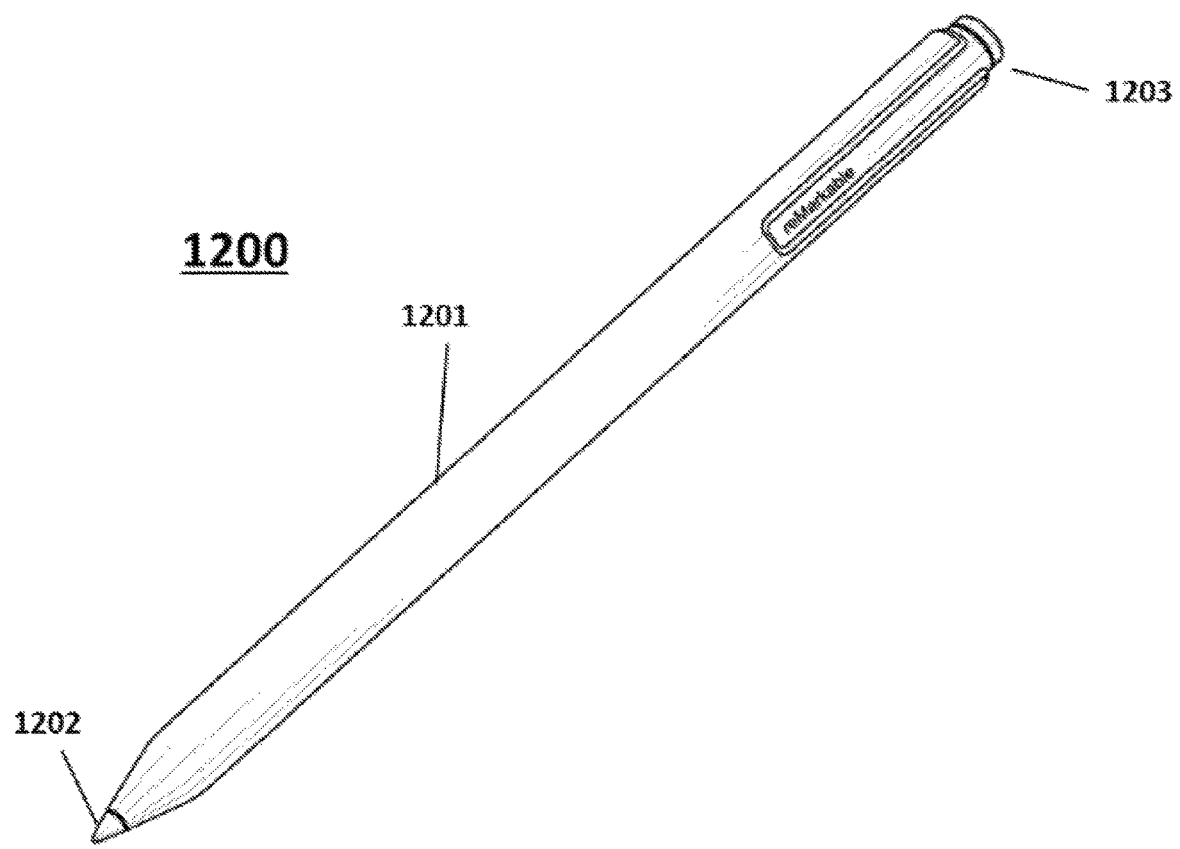
FIG. 12 illustrates an external casing 1201 for a pen-stylus 1200 designed to fit a user's hand, according to an embodiment of the invention.

FIG. 12 illustrates an external casing 1201 for a pen-stylus 1200 designed to fit a user's hand, according to an embodiment of the invention. The pen-stylus 1200 includes a marker tip 1202 and an eraser 1203. The marker tip 1202 operates as a part of the core member 1102 shown in FIG. 11, and the eraser 1203 operates as part of the second antenna system 1103 shown in FIG. 11.

Figures 13A, 13B:
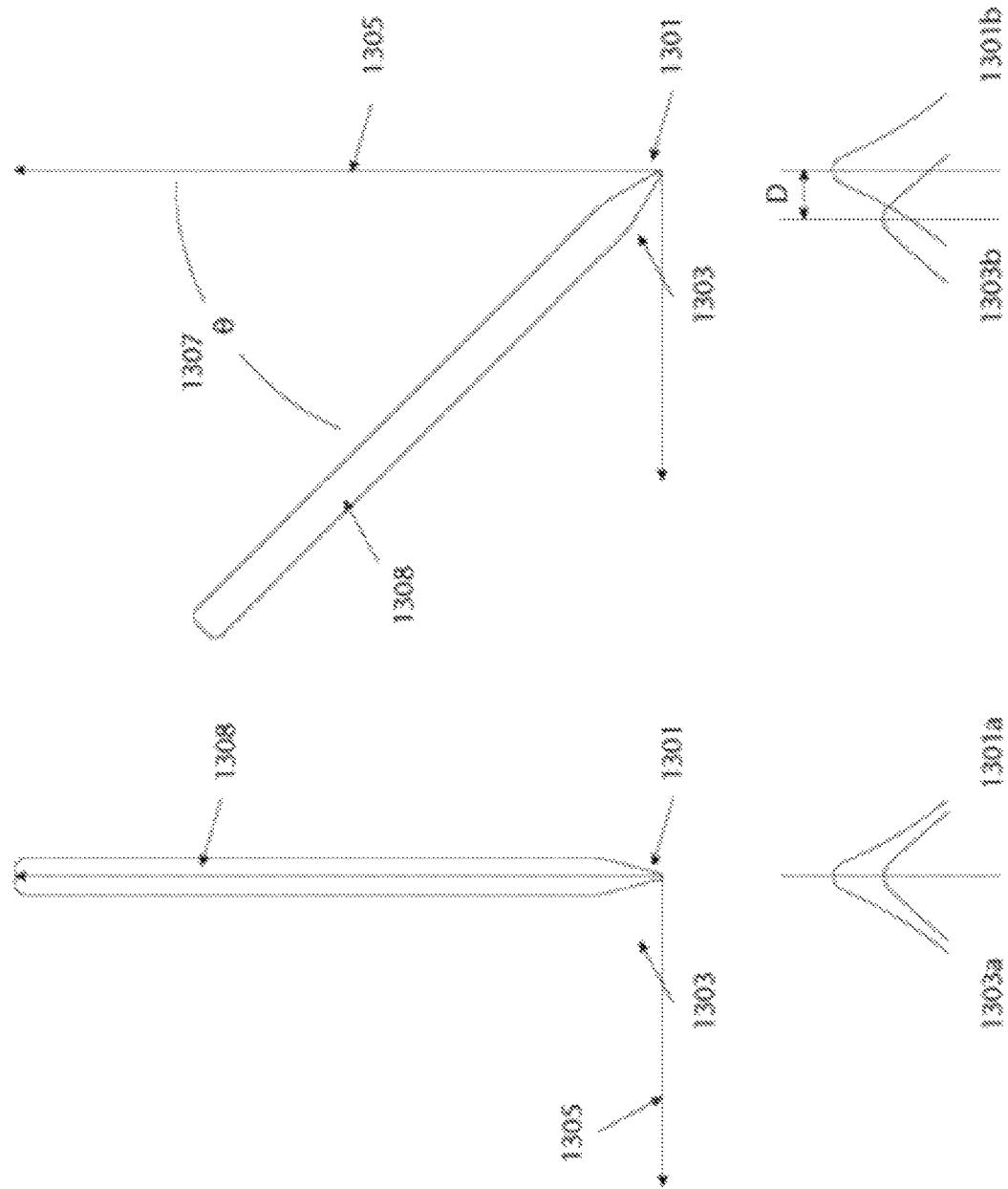
FIGS. 13A-13B illustrate two transmitters 1301, 1303 in a marker's tip (e.g., the core 1102 shown in FIG. 11) of an active pen-stylus 1308 giving a computing device (e.g., the e-paper tablet 110) the ability to measure two distinct signals.

When an active pen-stylus (e.g., the pen-stylus 1100 and/or the pen-stylus 1200) includes multiple antennas as part of the core (e.g., the core 1102), then the pen-stylus may provide additional capabilities. As shown in FIGS. 13A-13B, employing two separate transmitters 1301, 1303 in the marker tip (e.g., the core 1102 shown in FIG. 11) of the active pen-stylus 1308 gives the computing device (e.g., the e-paper tablet 110) the ability to measure two distinct signals (illustrated in FIG. 13A as 1301a, 1303a and illustrated in FIG. 13B as 1301b, 1303b). By knowing the antenna separation in the input device (e.g., the active pen-stylus 1308), the input digitizer 220 in a larger computing device, such as the e-paper tablet 110, can derive the active pen-stylus tilt angle θ 1307 relative to the computing device (e.g., the e-paper tablet 110). The input digitizer 220 is conventionally able to process active pen-stylus tilt information related to the drawing portion of the active pen-stylus. Only a slight change needs to be made to the input digitizer 220 for it to process tilt angle data related to an eraser (if erasure functionality if provided) to cause a change to the display on the e-paper tablet 110.

As seen in FIG. 13A, the signals 1301a, 1303a from the two antennas 1301, 1303 coincide when the active pen-stylus 1308 is perpendicular to the graphics display of the computing device (as shown by the grid 1305 and the line passing through the centers of both signals 1301a, 1303a). In contrast, FIG. 13B illustrates the active pen-stylus 1308 tilted by an angle θ 1307 relative to the display of the computing device (e.g., the e-paper tablet 110) as shown by the grid 1305 and the distance D marking the distance between the two centers of signals 1301b, 1303b. With such a tilt, the signals 1301b, 1303b from the two antennas 1301, 1303 are not aligned and are separated by the distance D. This distance D may be used to determine the corresponding drawing amount performed by the e-paper tablet device 110 on the display.

The method for deriving the tilt angle θ 1307 of the active pen-stylus 1308 is known when using two antennas (e.g., two separate antennas in the antenna system 1102 shown in FIG. 11, presented in FIGS. 13A and 13B as antennas 1301, 1303). The distance between antenna 1301 and antenna 1303 is fixed and known. This known separation, combined with basic trigonometry, can be employed in active pen tip antenna systems to derive the tilt angle for the active pen-stylus tip (e.g., the angle of the tip of the core member 1102 shown in FIG. 11 relative to the display 230 shown in FIG. 2 on the e-paper tablet 110). Thus, in one embodiment of the invention, as the tilt angle θ increases, the shading area proportionately increases on the display. One could similarly imagine a slightly different arrangement of the components such that as the tilt angle θ decreased, the area of marking area proportionately increased, e.g., in inverse proportion. In both embodiments, the area of marking still has a direct correlation to the tilt angle θ, e.g., as the tilt angle changes, the area of marking changes.

This tilt angle determination would operate in a similar manner for an erasure function. Embodiments of the invention allow for the derivation of the tilt angle of the tail eraser by employing an electronically calculated method in the input digitizer 220 similar to that employed conventionally by the input digitizer 220 for determining the tilt of the marker tip and the eraser function, when present. Such a calculation requires that the pen-stylus provide additional data/information to the input digitizer 220.

In some embodiments, the pen-stylus integrated circuits (e.g., included in the PCBA 1105) may not have a sufficient number of antenna signal lines for driving two transmitters in both the active pen tip and tail eraser antenna system. Conventional active pens have two antenna signal lines for the active pen-stylus tip and one antenna signal line for a tail eraser. Thus, no more than three antenna signal lines. With this conventional configuration, the input digitizer 220 (or comparable hardware) cannot derive the tilt information for the tail eraser. This problem has been solved in a manner that allows a conventional active pen configuration to drive four antennas rather than the conventional three antennas, thus enabling enhanced erasure capabilities. Further details about structures and functions for solving this problem may be found in U.S. application Ser. No. 18/208,280 to Gaute Nordby et al., entitled "Active Pen-Stylus Precise Eraser," which is incorporated by reference herein.

Figure 14:
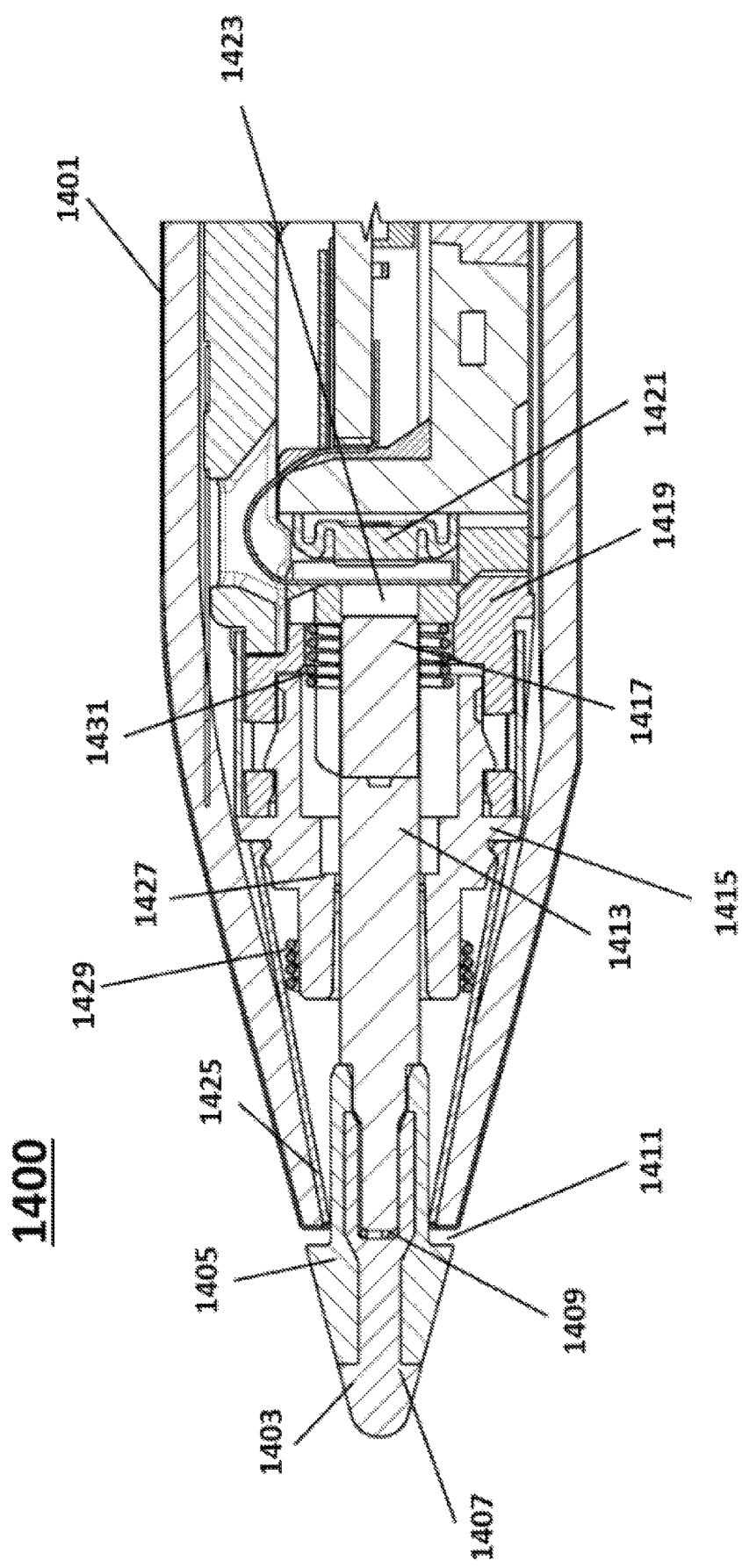
FIG. 14 illustrates a cross section of the forward portion of an active pen-stylus 1400 that a user may employ for tasks such as drawing a line on the display of a device (e.g., the e-paper tablet 110), according to an embodiment of the invention.

FIG. 14 illustrates a cross section of the forward portion of an active pen-stylus 1400 that a user may employ for tasks such as drawing a line on the display of a device (e.g., the display 303 of the e-paper tablet 300 shown in FIG. 3), according to an embodiment of the invention. The active pen-stylus 1400 includes a core (e.g., the core member 1102 shown in FIG. 11) comprised of components such as a first antenna 1407 and a second antenna 1425. The active pen-stylus 1400 also includes a force sensor (e.g., the force sensing system 1104 shown in FIG. 11) comprised of components such as a writing shaft 1413, a first spring coil 1431, a second spring coil 1429, and a force sensor 1423.

The active pen-stylus 1400 provides high accuracy for various drawing tasks due to interactions between the first antenna 1407 and the second antenna 1425, in part because of the placement of the first antenna 1407 and the second antenna 1425 with respect to each other and with respect to the active pen-stylus 1400 itself. As shown in FIG. 14, the second antenna 1425 surrounds the first antenna 1407, but the second antenna 1425 and the first antenna 1407 do not overlap horizontally in the active pen-stylus 1400 and are further separated from each other by the insulator 1405.

Each antenna 1407, 1425 may send a clear signal to the e-paper tablet 110. This arrangement is particularly helpful for the antenna 1425 since the antenna 1407 is often in physical contact with the display of the e-paper tablet 110. When the pen-stylus 1400 is not in contact (e.g., out of range) with the tablet (e.g., the e-paper tablet 110), antennas on the tablet periodically send a beacon signal. This beacon signal is meant for the pen-stylus 1400 to detect that it is within range of the tablet. In a time following the beacon signal, the tablet typically keeps an open time slot for the pen-stylus 1400 to acknowledge the beacon and respond to the tablet. This acknowledgement initiates the two-way communication between the pen-stylus 1400 and the tablet (e.g., the e-paper tablet 110). As an ordinary artisan will recognize, the "beacon" from the tablet is a form of an uplink to the pen-stylus 1400, and the communication from the pen-stylus 1400 to the tablet is a form of a downlink.

The active pen-stylus 1400 also offers advanced force (e.g., pressure) sensing, e.g., a low activation force, high maximum force, and a high dynamic range. To translate the detecting force imparted by the pen-stylus 1400 against the display of the e-paper tablet 110, the writing shaft 1413 is designed to move towards and/or away from a force sensor 1423, which registers activity between a replaceable marker tip 1403 and the display (e.g., the display of the e-paper tablet 110), including the pressure applied by the user of the pen-stylus 1400 to the display. Among other things, a bottom bracket 1419 prevents the writing shaft 1413 from rotating about its center axis. As previously discussed, the writing shaft 1413 is designed to move towards and/or away from a force sensor 1423, which registers activity between the replaceable marker tip 1403 and the display (e.g., the display of the e-paper tablet 110), including the force (e.g., pressure) applied by the user of the pen-stylus 1400 to the display. The active pen-stylus 1400 has been designed to have a minimum set of components, according to an embodiment of the invention. Further details about structures and functions of active pen-stylus writing systems are disclosed below.

The active pen-stylus 1400 includes a replaceable marker tip 1403 that includes a core antenna 1407 and an insulator 1405, according to an embodiment of the invention. The replaceable marker tip 1403 is held to the writing shaft 1413 by crush ribs 1409 and designed for hand removal by the user. The replaceable marker tip 1403 has a variable lifetime, depending on factors such as user personal sensitivity and user use patterns. Further details about structures and functions of replaceable marker tips can be found in U.S. application Ser. No. 18/779,151, filed on Jul. 22, 2024 entitled "Replaceable Conductive Marker Tip," and given reference number "21149400," which is incorporated by reference herein.

The active pen-stylus 1400 offers a variety of device safety features for its operational protection and long service life. Among other things, the writing shaft 1413 may be fitted with an impact shock 1417 that is designed to receive heavy forces imparted to the pen-stylus 1400 (e.g., the force arising from being dropped onto a hard surface) so that an upper limit is set for the forces transmitted to the force sensor 1423.

The replaceable marker tip 1403 has also been designed to leave a marker tip clearance 1411 between itself and the marker body 1401, according to an embodiment of the invention. The marker tip clearance 1411 may also be helpful in receiving certain shock forces to the pen-stylus 1400 that might otherwise be received by components inside the pen-stylus 1400. In the event of a severe shock, the replaceable marker tip 1403 may also function as a sacrificial element that may even absorb otherwise destructive energy. In situations where the replaceable marker tip 1403 has absorbed so much destructive energy that it can no longer function, then the user of the pen-stylus 1400 may simply need to add a new replaceable marker tip 1403 to an otherwise workable pen-stylus 1400.

Further details about structures and functions of active pen-stylus safety systems can be found in U.S. application Ser. No. 18/779,158, filed on Jul. 22, 2024 entitled "Marker Protection System," and given reference number "21149402," which is incorporated by reference herein. The pen-stylus 1400 may include other components, such as a writing system spring 1421 which in cooperation with the force sensor 1423 may present to the user of the pen-stylus 1400 the feeling of writing on a stack of paper. Further details about structures and functions of active pen-stylus paper emulation can be found in U.S. application Ser. No. 18/779,154, filed on Jul. 22, 2024 entitled "Advanced Paper Emulation," and given reference number "21149401," which is incorporated by reference herein.

Advanced Marker Writing System

The pen-stylus 1400 provides highly accurate signal input for the writing system of the e-paper tablet 110 enabled, among other things, by careful attention to the design and placement of the two antennas 1407, 1425 shown in FIG. 14, including their geometries and their arrangement with respect to each other and with respect to the pen-stylus 1400 itself. One of the antennas may be a transceiver and the other antenna is a transmitter. For example, the antenna 1425 is a transceiver while the antenna 1407 is a transmitter, according to an embodiment of the invention. As mentioned, the first antenna 1407 is embedded in a removable marker tip 1403 that also includes an insulator 1405.

The writing system for the pen-stylus 1400 may be considered somewhat simplified and streamlined since some mechanical components found in the prior art have been removed and/or combined with other components to offer combined functions, such as the marker tip 1403 that serves as both a force (e.g., pressure) sensing mechanism and as an antenna, according to an embodiment of the invention.

In addition, the writing system for the pen-stylus 1400 has been designed to embody careful geometries for the two antennas 1407, 1425 and the relationship between them. This is achieved by splitting the marker tip 1403 into a conductive material (that serves as an antenna 1407) and an insulating material 1405. This combination provides a certain design freedom by also taking advantage of the insulating properties to utilize the second antenna 1425 as the constraining surface for the marker tip 1403. This enables the distance to the second antenna 1425 to be closer to perfect from a signaling perspective, a short and stiff cantilever from a mechanical perspective, and aesthetically pleasing with its proportions from a design perspective, according to an embodiment of the invention. The metal interface between the second antenna 1425 also reduces the friction which results in a better resolution of the force measurement.

Figure 16:
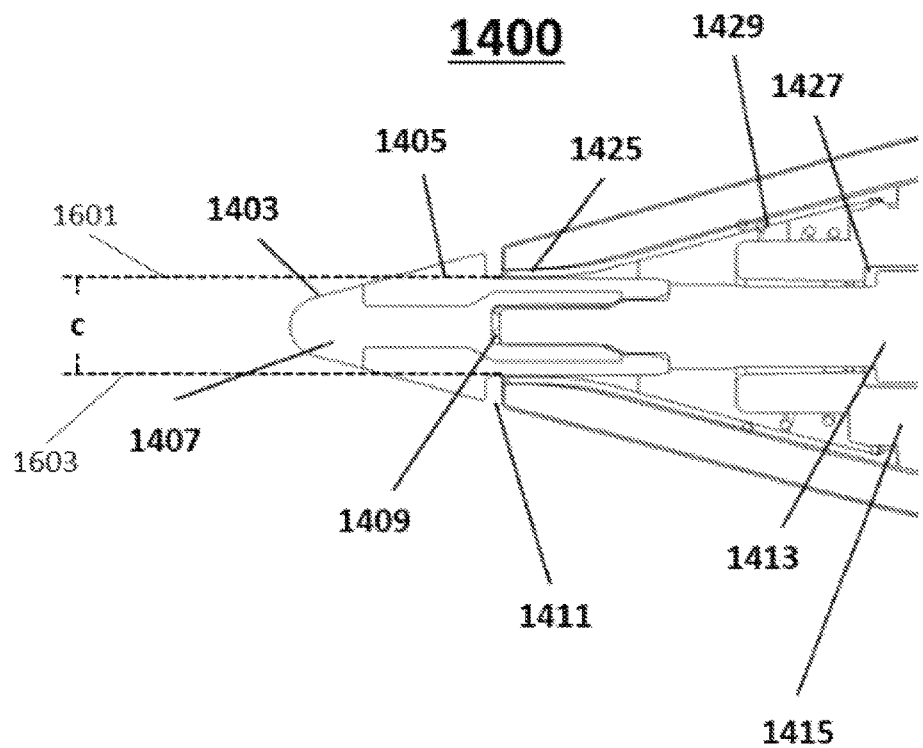
FIG. 16 provides a close-up view of the front edge of the pen-stylus 1400 shown in FIG. 14, further illustrating a separation distance c between the antenna 1425 and the antenna 1407, according to an embodiment of the invention.

The ideal shape for the marker on a pen-stylus comprises a sphere. Accordingly, the front portion of the core antenna 1407 comprises a hemisphere. The shape of the core antenna 1407 replicates a sphere well at most angles, degrading only slightly at shallow angles, such as when the user has positioned the pen-stylus 1400 at such a shallow angle that the length of its body nearly touches the display of the e-paper tablet 110. Nevertheless, the signal remains constant even when the user has tilted the pen-stylus 1400 at a shallow angle. As shown in FIG. 14, the core antenna 1407 is located at a proximal end of the pen-stylus 1400 where the pen-stylus 1400 engages with a display of the e-paper tablet 110 and is also positioned along a centerline that runs from the proximal end of the pen-stylus 1400 to a distal end of the pen-stylus 1400. (As shown in FIG. 16, the distal end of the pen-stylus 1400 may include components that provide an eraser function.) The antenna 1407 may provide a main antenna for the pen-stylus 1400 while also serving as the main contact point between the pen-stylus 1400 and the display of the e-paper tablet 110. The antenna 1425 provides a secondary signal that in combination with the antenna 1407 may be used to determine the marker's orientation, as discussed above with respect to FIGS. 13A-13B.

Figure 15:
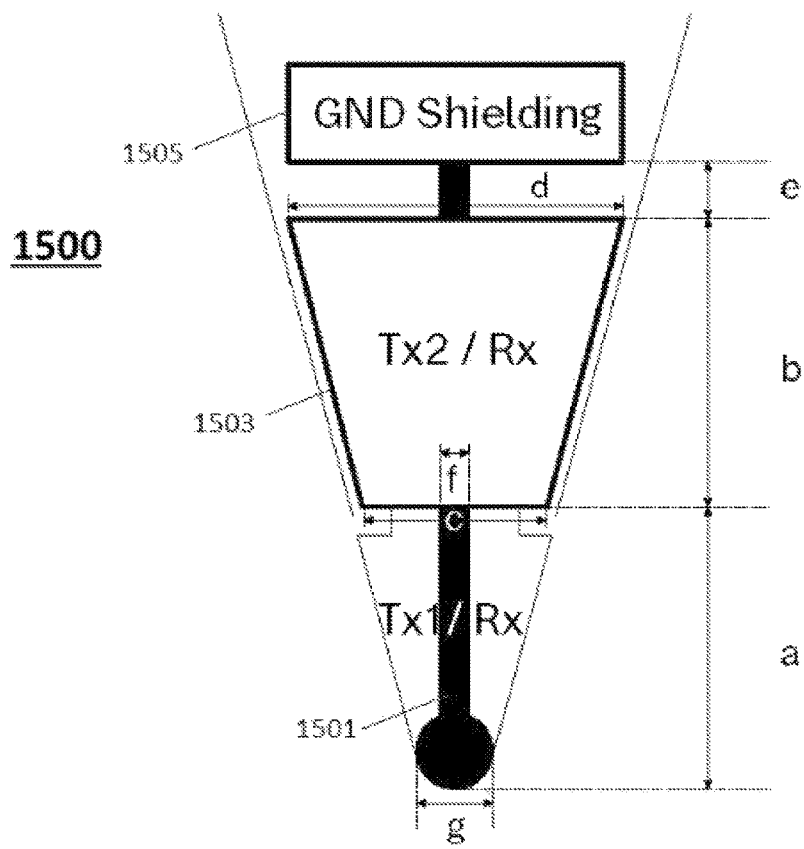
FIG. 15 provides an abstract illustration of the antenna system for the pen-stylus 1400 with one receiving antenna and two transmitting antennas, e.g., one transceiver 1503 and one transmitter 1501, according to an embodiment of the invention.

FIG. 15 provides an abstract illustration of the antenna system for the pen-stylus 1400 (labeled 1500) with one receiving antenna and two transmitting antennas, e.g., one transceiver 1503 and one transmitter 1501, according to an embodiment of the invention. For example, in an embodiment of the invention, the antenna 1425 includes a transmitting electrode and a receiving electrode (e.g., they may share an electrode) and acts as the transceiver 1503 while the antenna 1407 acts as the transmitter 1501. This design supports and facilitates the tilt angle detection described in FIGS. 13A-13B, according to an embodiment of the invention.

As we know, the marker tip 1403 transmits axial forces while the transmitter 1501 embedded in the marker tip 1403 (as the antenna 1407) communicates electronically with the display on the e-paper tablet 110. Thus, the front edge of marker tip 1403 acts as a leading edge for sensing and communications for the pen-stylus 1400. FIG. 15 provides an abstract view of the antennas 1407, 1425 (labeled 1501, 1503 in FIG. 15) of the pen-stylus 1400 (labeled 1500 in FIG. 15). The marker tip 1403 shown in FIG. 14 includes the transmitter 1501 (as the antenna 1407) with the transceiver 1503 (as the antenna 1425) extending outside the diameter of the transmitter 1501, both the transmitter 1501 and the transceiver 1503 forming an antenna structure that includes ground shielding 1505. The antenna 1501 is located at a proximal end of the pen-stylus 1500 where the pen-stylus 1500 engages with a display of the e-paper tablet 110 and is also positioned along a centerline that runs from the proximal end of the pen-stylus 1500 to a distal end (not shown) of the pen-stylus 1500.

For at least one embodiment of the invention that supports the tilt angle detection described in FIGS. 13A-13B, the settings for these antenna parts (using the a-e list displayed in FIG. 15) may be:

a. Target length for the transmitter 1501=4 mm
b. Target length for the transceiver 1503=8 mm
c. The target width for the outward portion of the transceiver 1503 should be as small as possible, although the exact distance depends on the specific design
d. The target width for the inward portion of the transceiver 1503 should be big as possible, satisfying the criteria:
   Min diameter: >c
   Max diameter: <c+b
e. Distance between end of the antenna system and the ground shielding 1505 should be as small as possible, e.g., at least <1 mm FIG. 16 provides a close-up view of the front edge of the pen-stylus 1400 shown in FIG. 14. As shown in FIG. 16, a line 1601 can be drawn tangentially from an interior edge of the antenna 1425 that does not touch the antenna 1407 in the marker tip 1403. Similarly, another line 1603 can be drawn tangentially from an opposite interior edge of the antenna 1425 that also does not touch the marker tip 1403. A circle of such lines 1601, 1603 around the interior edges of the antenna 1425 would show no overlap with the antenna 1407, according to an embodiment of the invention. The distance c between the lines 1601 and 1603 corresponds to the distance c illustrated in FIG. 15.

Thus, the antenna 1425 does not overlap with the antenna 1407. In addition, the insulation 1405 in the marker tip 1403 further separates and isolates signals from the antennas 1407, 1425. Thus, each antenna 1407, 1425 may send a clear signal to the e-paper tablet 110. This arrangement is particularly helpful for the antenna 1425 since the antenna 1407 is often in physical contact with the e-paper tablet 110 and can likely maintain a stronger signal.

The insulating material 1405 also provides a measure of design freedom for the pen-stylus 1400 by taking advantage of the insulating properties to utilize the second antenna 1425 as a constraining surface for the marker tip 1403 that includes the first antenna 1407. This arrangement enables the distance between the first antenna 1407 and the second antenna 1425 to be close to optimum from a signaling perspective while also providing a short and stiff cantilever from a mechanical perspective that may also be aesthetically pleasing in its proportions from a design perspective. The metallic interface with the second antenna 1425 also reduces the friction which results in a better resolution of the force measurement for the pen-stylus 1400.

When the pen-stylus 1400 is not in contact (e.g., out of range) with the tablet (e.g., the e-paper tablet 110), antennas on the tablet periodically send a beacon signal. This beacon signal is meant for the pen-stylus 1400 to detect that it is within range of the tablet. In a time following the beacon signal, the tablet typically keeps an open time slot for the pen-stylus 1400 to acknowledge the beacon and respond to the tablet. This acknowledgement initiates the two-way communication between the pen-stylus 1400 and the tablet (e.g., the e-paper tablet 110). As an ordinary artisan will recognize, the "beacon" from the tablet is a form of an uplink to the pen-stylus 1400, and the communication from the pen-stylus 1400 to the tablet is a form of a downlink.

The writing system of the pen-stylus 1400 may also include an erasure functionality, and if the pen-stylus 1400 includes erasure functionality, then it will likely include antennas associated with the erasure functionality, according to an embodiment of the invention. When the tablet (e.g., the e-paper tablet 110) receives the downlink from the pen-stylus 1400, the tablet detects from which antenna system on the pen-stylus 1400 the tablet's beacon was received, e.g., the writing antenna system or the erasure antenna system. Thus, the tablet knows if it is communicating with the marker tip (e.g., the writing system) or the erasure system on the rear end of the pen-stylus 1400. Since the erasure system is on the posterior of the pen-stylus 1400, the tablet knows whether the tip or tail of the pen-stylus 1400 is the closest to it, and likewise the orientation of the pen-stylus 1400, e.g., marker tip down or marker tip up. Thus, as the orientation of the pen-stylus 1400 changes from marker tip down to marker tip up, the tablet and the pen-stylus 1400 may engage the erasure function.

Alternatively, an Inertial Measurement Unit (IMU) (not shown) in FIG. 14 in the pen-stylus 1400 may sense the orientation of the pen-stylus and engage the electronics in the pen-stylus 1400 (e.g., the PCBA 1105 shown in FIG. 11) to flip to the eraser function as the pen rotates away from the writing function. A precise eraser invention has already been created by the inventors of the present invention and may be found in U.S. application Ser. No. 18/208,280 to Gaute Nordby et al., entitled "Active Pen-Stylus Precise Eraser," which is incorporated by reference herein.

Figure 17:
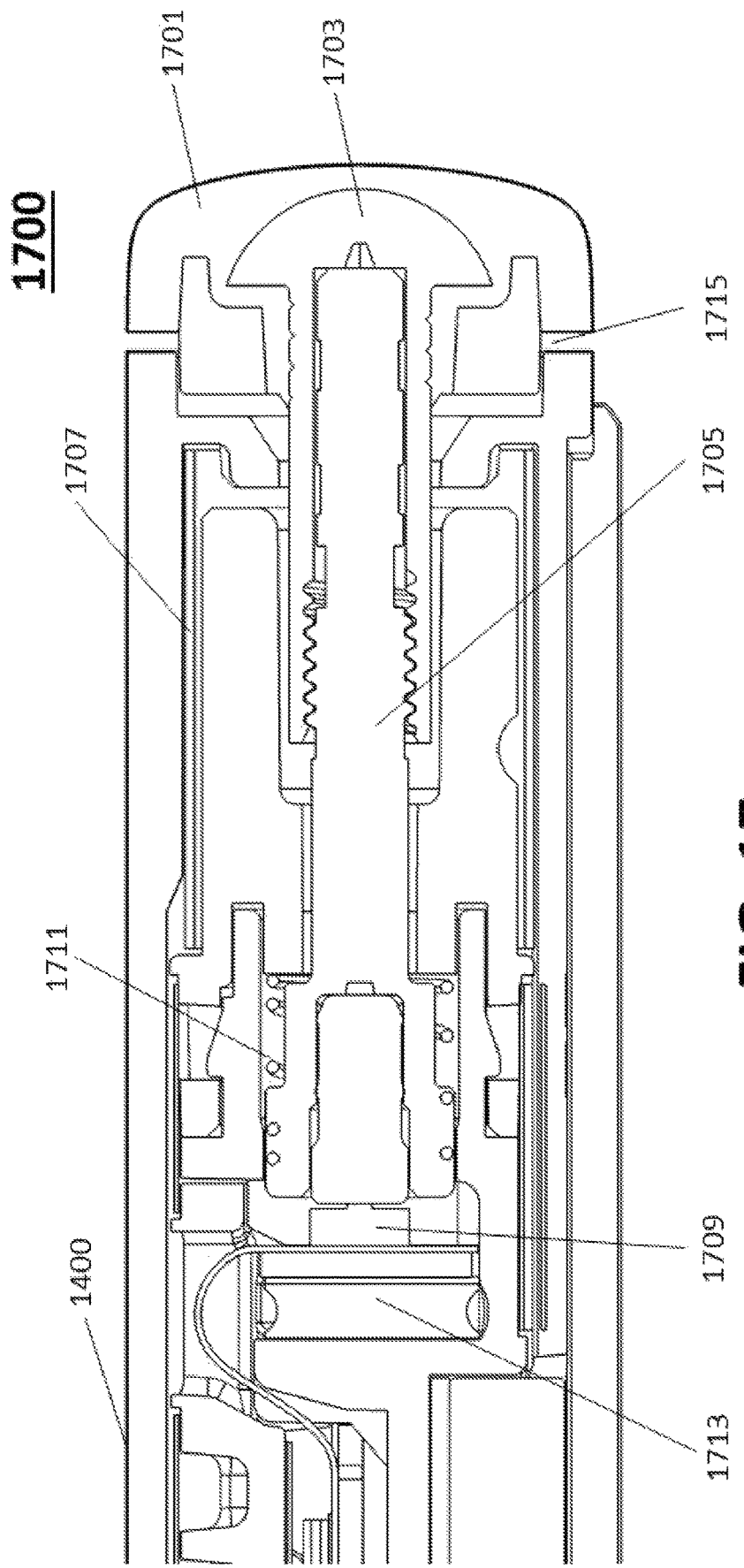
FIG. 17 illustrates an erasure system in a rear portion 1700 of the pen-stylus 1400, according to an embodiment of the invention.

As shown in FIG. 17, a rear portion 1700 of the pen-stylus 1400 includes an eraser cap 1701, a first rear antenna 1703, a second rear antenna 1707, a rear eraser shaft 1705, a rear eraser gap 1715, a rear spring coil 1711, a rear force sensor 1709, and a rear eraser spring 1713, according to an embodiment of the invention. The first rear antenna 1703 and the second rear antenna 1707 provide similar functionality in support of the erasure system as the front antenna 1407 and the front antenna 1425 provide for the writing system. The rear eraser shaft 1705 provides similar functionality for the erasure system that the writing shaft 1413 provides for the writing system. The rear eraser gap 1715 provides a similar safety function for the erasure system that the marker tip gap 1411 provides for the writing system. The rear spring coil 1711 provides a similar function for the erasure system that the spring coil 1431 provides for the writing system. The rear force sensor 1709 provides the same function for the erasure system that the force sensor 1423 provides for the writing system, and the rear spring 1713 provides a similar function for the erasure system that spring pad 1421 provides for the writing system.

Additional Considerations

As discussed below, these pen-styluses can be equipped with a tail eraser allowing the user to erase content from the display of the computing device, e.g., the e-paper tablet 110. An active pen includes electronics components which enables the active pen to send and receive signals from the computing device.

This disclosed configuration provides additional precision and options for users as they go about erasing portions of drawings on an e-paper tablet. This should improve the efficiency of users interacting with e-paper tablets while also enabling them with more precise functional capabilities.

It is to be understood that the figures and descriptions of the present disclosure have been simplified to illustrate elements that are relevant for a clear understanding of the present disclosure, while eliminating, for the purpose of clarity, many other elements found in a typical system. Those of ordinary skill in the art may recognize that other elements and/or steps are desirable and/or required in implementing the present disclosure. However, because such elements and steps are well known in the art, and because they do not facilitate a better understanding of the present disclosure, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise. While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A pen-stylus having a body, comprising:
   a first antenna having a hemispherical shape and positioned in a removeable marker tip at a proximal end of the pen-stylus where the pen-stylus engages with a display of a tablet device, wherein the first antenna touches the display in operation;
   a second antenna having a canonical shape and located in the body of the pen-stylus, wherein the first antenna and the second antenna communicate with the tablet device to enable a pen-stylus user to draw on the display of the tablet device; and
   an insulating material between the first antenna in the removable marker tip and the second antenna in the body of the pen-stylus that prevents interference between the first antenna and the second antenna.

2. The pen-stylus of claim 1 wherein the body of the pen-stylus has a cylindrical pencil-shaped outer surface having a centerline running from the proximal end of the pen-stylus to a distal end of the pen-stylus, wherein the first antenna lies on the centerline and avoids physical overlap with the second antenna around the centerline, wherein the insulating material resides around the centerline between the first antenna and the second antenna and wherein the second antenna resides around the centerline.

3. The pen-stylus of claim 1, wherein the body of the pen-stylus has a cylindrical pencil-shaped outer surface having a centerline running from the proximal end of the pen-stylus to a distal end of the pen-stylus, wherein the dimensions of the first antenna and the second antenna satisfy the following conditions:
   a length of the second antenna around the centerline is approximately twice as long as a length of the first antenna around the centerline; and
   a first edge of the second antenna closest to the proximal end of the pen-stylus has a diameter along the centerline larger than a diameter of the first antenna along the centerline; and
   a sum of the length of the second antenna along the centerline plus a length of a diameter of the second antenna at the proximal end is greater than a diameter of the second antenna at second edge of the second antenna located farthest from the proximal end, wherein a diameter of the second antenna at the first edge is smaller than a diameter of the second antenna at the second edge.

4. The pen-stylus of claim 1, further comprising:
   ground shielding residing at a distal end of the first antenna and at a distal end of the second antenna.

5. The pen-stylus of claim 1, wherein the marker tip transmits axial forces received by engagement of the pen-stylus with the display on the tablet to a force sensor, the pen-stylus further comprising:
   a force sensor that converts axial forces received from the marker tip into an electrical signal and transmits the electrical signal to the tablet by at least one of the first antenna and the second antenna.

6. The pen-stylus of claim 1 wherein the marker tip comprises a material that wears over time.

7. The pen-stylus of claim 1 wherein at least one of the first antenna and the second antenna receive an uplink signal from the tablet device and send a first downlink in response, the first downlink informing the tablet device that the pen-stylus is in range.

8. The pen-stylus of claim 1, further comprising:
   a third antenna located along a centerline in a distal portion of the pen-stylus; and
   a fourth antenna located in the distal portion of the body of the pen-stylus,
   wherein the third antenna and the fourth antenna are associated with an eraser function of the pen-stylus,
   wherein at least one of the third antenna and the fourth antenna are configured to receive the uplink signal from the tablet and send a second downlink in response,
   wherein receipt of one of the first downlink and the second downlink allows the tablet device to calculate an orientation of the pen-stylus with respect to the display of the tablet device.

9. The pen-stylus of claim 8, further comprising:
   an eraser cap located at a distal end of the pen-stylus and covering at least one of the third antenna and the fourth antenna.

10. The pen-stylus of claim 1 wherein the first antenna is a transmitter and the second antenna is a transceiver.

11. The pen-stylus of claim 1 wherein the tablet device is an e-paper tablet device that emulates conventional paper for users of the pen-stylus.

12. The pen-stylus of claim 1 wherein the insulating material is located in the removeable marker tip.

* * * * *